United States Patent [19]
Endo et al.

[11] Patent Number: 6,067,455
[45] Date of Patent: May 23, 2000

[54] DIGITAL MOBILE TELEPHONE SYSTEM HAVING OVERLAY CONFIGURATION

[75] Inventors: Takashi Endo; Yuriko Matsukida, both of Kawasaki, Japan

[73] Assignee: Fujitsu Limited, Kawasaki, Japan

[21] Appl. No.: 07/983,865

[22] PCT Filed: Jul. 15, 1992

[86] PCT No.: PCT/JP92/00903

§ 371 Date: Mar. 5, 1993

§ 102(e) Date: Mar. 5, 1993

[87] PCT Pub. No.: WO93/02509

PCT Pub. Date: Feb. 4, 1993

[30] Foreign Application Priority Data

Jul. 17, 1991 [JP] Japan .................................. 3-176331
Feb. 18, 1992 [JP] Japan .................................. 4-030539

[51] Int. Cl.[7] .......................................................... H04Q 7/20
[52] U.S. Cl. .......................................... 455/444; 455/436
[58] Field of Search ................................. 379/58, 59, 60; 455/33.1, 33.2, 54.1, 56.1, 403, 422, 436, 438, 450, 561, 562, 444

[56] References Cited

U.S. PATENT DOCUMENTS

| | | | |
|---|---|---|---|
| 4,144,411 | 3/1979 | Frenkiel | 379/60 |
| 4,989,230 | 1/1991 | Gillig et al. | 379/59 |
| 5,243,598 | 9/1993 | Lee | 455/54.1 X |
| 5,278,991 | 1/1994 | Ramsdale et al. | 455/33.2 |
| 5,327,576 | 7/1994 | Uddenfeldt et al. | 455/436 |

FOREIGN PATENT DOCUMENTS

| | | |
|---|---|---|
| 62-92630 | 4/1987 | Japan . |
| 63-70622 | 3/1988 | Japan . |
| 3-295324 | 12/1991 | Japan . |
| 4-47722 | 2/1992 | Japan . |

*Primary Examiner*—William G. Trost
*Attorney, Agent, or Firm*—Staas & Halsey, LLP

[57] ABSTRACT

The digital mobile telephone system according to the present invention having an overlay configuration, allows a mobile terminal communicating with a base station to detect the field strength of a transmission from the base station covering a sector and an overlay region, notifies a switching station of the result of detection, and causes a frequency used in communication between the base station and the mobile terminal to be switched to the communication frequency for the overlay region, when the detected field strength exceeds a predetermined threshold level. When the detected field strength drops below the predetermined threshold level, the switching station switches the frequency used in communication between the base station and the terminal to the communication frequency for the sector.

16 Claims, 16 Drawing Sheets

FIG.1(A)
PRIOR ART
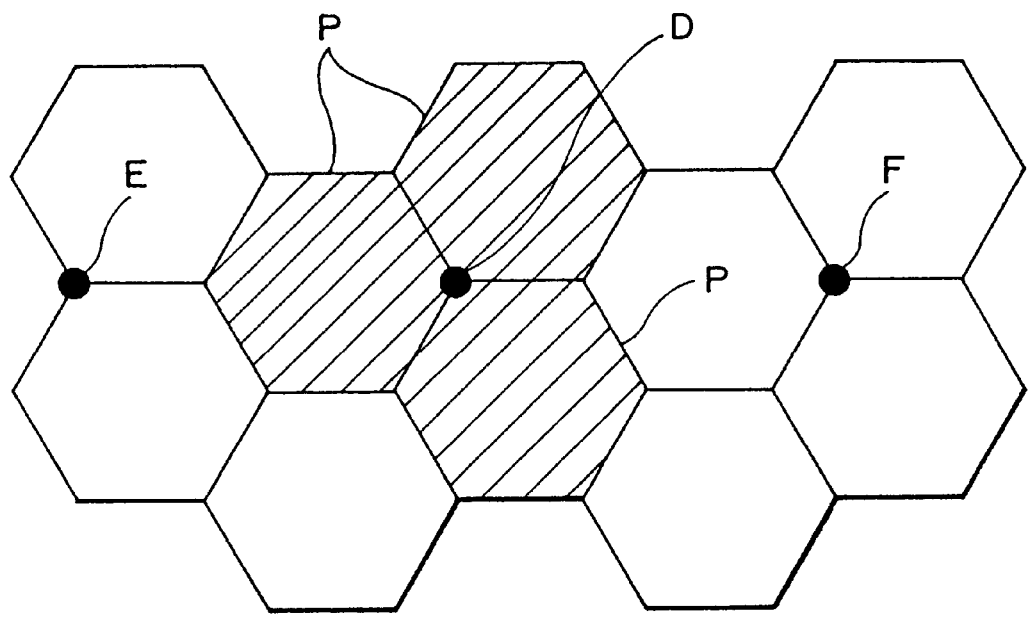
FIG.1(B)
PRIOR ART
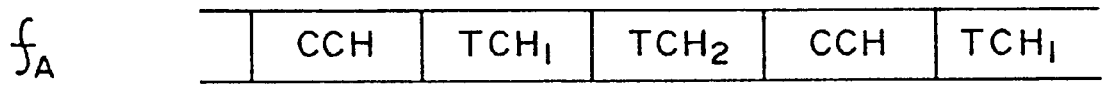
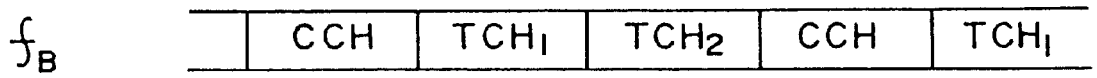

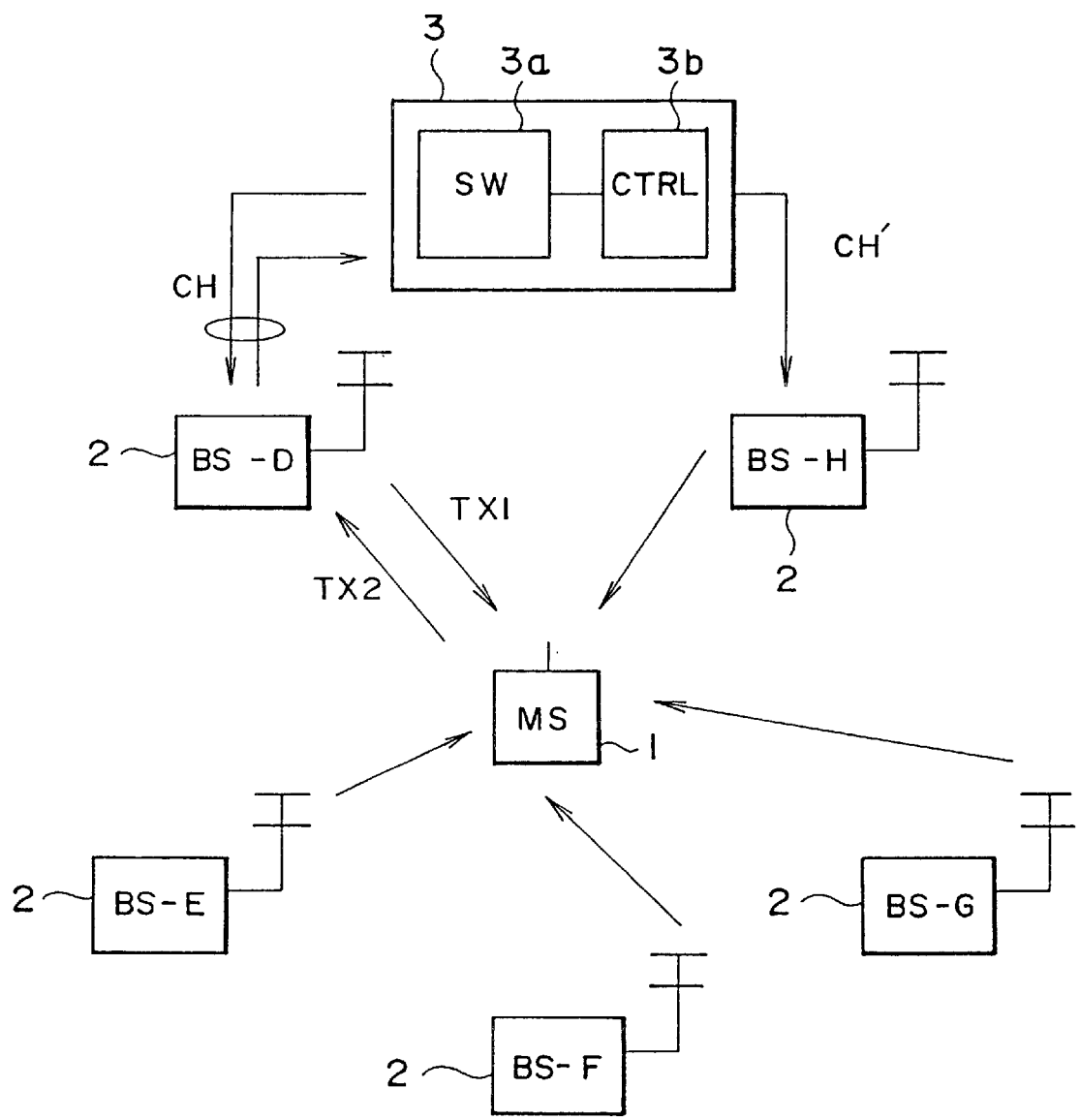

DIGITAL MOBILE TELEPHONE SYSTEM HAVING OVERLAY CONFIGURATION

FIELD OF THE INVENTION

The present invention generally relates to a digital mobile telephone system, and more particularly to a digital mobile telephone system of a so-called cellular type in which system the service area is divided into a plurality of cells or sectors, a base station being provided for each cell.

BACKGROUND ART

With automobile telephones or portable telephones becoming more and more widely used, a problem has been revealed in that the conventional analog mobile telephone system tends to be short on radio channels. While it is true that the conventional analog mobile telephone system can be easily configured, it has a disadvantage in that its allocation of one frequency to one channel entails inefficiency in the use of frequencies. On the other hand, with time division multiplexing effected in the digital mobile telephone system, a single frequency can be shared by a plurality of channels, thereby improving efficiency in usage of frequencies. It is also to be noted that the digital mobile telephone system can provide advanced services other than conventional voice call service.

FIG. 1(A) illustrates a service area of the conventional digital mobile telephone system of a cellular type.

Referring to FIG. 1(A), a service area of the mobile telephone system is divided into cells or sectors P having, for example, a hexagonal shape, each of a plurality of base stations D, E, F being provided to correspond to a plurality of sectors. In the illustrated example, a base station D is provided in the center of the three hatched sectors P, the base station D covering the three sectors in different frequencies. Likewise, each of the base stations E, F cover three sectors. In such a digital mobile telephone system of a cellular type, it is possible to avoid interference among the sectors by using different frequencies in different sectors. Typically, a sector has a scale of about 500 m–5 km.

FIG. 1(B) schematically illustrates a signal format used in the system of FIG. 1(A).

Referring to FIG. 1(B), a signal having a frequency $f_A$ transmitted from a base station—for example, the base station D—contains three channels $TCH_1$, $TCH_2$, CCH obtained as a result of time division multiplexing, of which three channels the channels $TCH_1$, $TCH_2$ are used as communication channels, and the channel CCH is used as a control channel for line connection control, etc. Likewise, a signal having a frequency $f_a$ received by the base station D contains channels obtained as a result of time division multiplexing: namely, communication channels $TCH_1$, $TCH_2$ and a control channel CCH. While the communication channels $TCH_1$, $TCH_2$ carry independent speech signals, etc., the control channel CCH is provided to be shared by the channels $TCH_1$, $TCH_2$. With such time division multiplexing, the digital mobile telephone system shown in FIG. 1(A) accomplishes more efficient use of frequencies than the analog system.

FIG. 2 illustrates the configuration of the digital mobile telephone system covering the service area of FIG. 1(A).

Referring to FIG. 2, the system comprises: a mobile terminal 1 moving about in the service area of FIG. 1(A); radio base stations 2 corresponding to the base stations D, E, F of FIG. 1 and communicating with the mobile terminal 1 using a radio channel; and a switching station 3 connected to the radio base stations 2 via wire or radio lines and connected further to the public telephone line, the mobile terminal being connected to the public telephone line via the switching station and the radio base station. In such a digital mobile telephone system, there is a need to change the frequency used in communication with the base station, when the mobile terminal 1 moves from one sector to another. For this purpose, the switching station 3 is equipped with a control apparatus 3b besides an ordinary switching apparatus 3a. On the basis of the field strength of the radio wave signal transmitted from the base station and detected by the mobile terminal 1, the control apparatus 3b changes the setting of the frequency used by the mobile terminal so that the frequency transmitted from the base station and producing the greatest field strength may be set to be used.

More specifically, in the case that the switching station 3 is connected to a radio station BS-D via a line CH, and the mobile terminal 1 receives messages on the public telephone line via a transmission TX1 from the base station BS-D, the mobile terminal 1 measures the field strength of the transmission TX1 and determines whether or not the measurement result exceeds a predetermined threshold level. If it is found that the field strength exceeds the predetermined level, the mobile terminal 1 maintains its line connection with the base station BS-D; if it is found that the field strength is below the threshold level, the terminal 1 measures the field strength of transmissions from other radio base stations BS-E–BS-H searching for the base station producing the greatest field strength. The identity of the base station determined to be used in this search is reported to the base station BS-D via a transmission line TX2; and the information thus reported 35 is forwarded from the base station BS-D to the control apparatus 3b of the switching station 3 via the line CH. Thereupon, the control 3b switches the line for use in connecting with the mobile terminal 1 from the line CH which runs by way of the base station BS-D to, for example, a line CH' which runs by way of the base station H, i.e., the base station producing the greatest field strength. By thus selecting the base station used in communication with the mobile terminal 1 on the basis of the field strength such that the greatest field strength may be obtained, it is possible to maintain a stable line connection whichever sector in the service area the mobile terminal is in.

There is proposed, for such a conventional digital mobile telephone system as shown in FIGS. 1(A), 1(B) and in FIG. 2, a so-called overlay configuration shown in FIG. 3 designed to further improve efficiency in the use of frequencies. In the overlay configuration, overlay regions Q, covering a range substantially smaller than the size of the sector, are formed to correspond to each of the base stations BS-D, BS-E, BS-F, etc. For each base station, the overlay region Q is covered by a small-power transmission at a frequency different from the frequency characterizing the sector, with the result that the frequency band of the system increases substantially. By forming the overlay regions Q using the frequency of the same frequency range for every station, the system's efficiency in the use of frequencies is greatly improved. Since the overlay regions Q are independent of each other, no interference arises even if the same frequency is used from one overlay region to another.

When operating the mobile telephone system having such overlay regions Q, various problems needing a solution exist that are related, for example, to frequency switching control of the mobile terminal. For example, while the conventional cellular system enables selection of the base station producing the greatest field strength around the mobile terminal, as described earlier, the mobile terminal frequency switching control employed in the conventional cellular system is not effective in case the mobile terminal moves in and out of the overlay region, since the field strength in the overlay region is smaller than that in the sector covered by the same base station. There is a need, when operating the digital mobile telephone system having an overlay configuration, to establish a switching control method for selecting the frequency used in communication between the mobile terminal and the base station, which method is effected when the mobile terminal moves in and out of the overlay region.

DISCLOSURE OF THE INVENTION

Accordingly, a general object of the present invention is to provide a novel and useful digital mobile telephone system in which the above problems are eliminated.

A more specific object of the present invention is to provide a digital mobile telephone system of a cellular type having an overlay configuration and enabling the frequency used in communication between the mobile terminal and the base station to be changed when the mobile terminal moves in and out of the overlay region.

Still another object of the present invention is to provide, in a digital mobile telephone system of a cellular type having an overlay configuration, a method of controlling frequency switching necessitated particularly by the movement of the mobile terminal in and out of the overlay region.

Still another object of the present invention is to provide a digital mobile telephone system comprising: a switching station connected to a public telephone line and connecting a mobile terminal to the public telephone line; one or a plurality of base stations connected to the switching station and each covering one or a plurality of sectors with transmission of a radio signal having a first frequency different from one sector to another, the covering being done in such a manner that the field strength of the radio signal exceeds a predetermined level in each sector, and the base station in each sector receiving a radio signal having a second frequency different from the first frequency and different from one sector to another; a mobile terminal receiving, in each sector, a radio signal having the first frequency and transmitting a radio signal having the second frequency in its communication with the base station corresponding to the sector; a control apparatus provided in the switching station and controlling the base station and the mobile terminal so as to control the first frequency and the second frequency to correspond to the one or the plurality of sectors, the digital mobile telephone system being characterized in that:

each of the base stations covers, with transmission of a radio signal having a third frequency different from the first and second frequencies, an overlay region which is characterized by field strength smaller than that in the one or the plurality of sectors and has a range smaller than that of the one or the plurality of sectors; the mobile terminal monitors, in each sector, the field strength of the radio signal transmitted from the base station, and transmits a control signal indicative of the result of monitoring to the base station; the base station forwards the control signal transmitted from the mobile terminal to the control apparatus provided in the switching station; the control apparatus switches, on the basis of the control signal forwarded from the base station, the transmission frequency of the base station from the first frequency to the third frequency, when field strength of the radio signal transmitted from the base station and monitored by the mobile terminal exceeds a predetermined threshold field strength level, while, at the same time as this, switching the reception frequency from the second to the fourth frequency, switching the reception frequency of the mobile terminal from the first frequency to the third frequency; and switching the transmission frequency thereof from the second frequency to a fourth frequency.

According to the present invention, it is possible to greatly improve efficiency in the use of frequencies in the digital mobile telephone system, by using an overlay region. Since the overlay regions are provided for each base station independently of each other, the same frequency can be used in all the stations as far as the third frequency and the fourth frequency are concerned and still no interference occurs. This contributes to a great improvement in efficiency of the use of frequencies in the system. Since the present invention allows the field strength in the overlay region to be monitored by the mobile terminal, making the result of monitoring available as a basis on which to switch the frequency, a smooth switching of the communication frequency is possible. It should be noted that, in the present invention, when switching the reception frequency of the mobile terminal to the reception frequency characterizing the overlay region, the third frequency, producing the field strength smaller than that produced by the frequency characterizing the sector, is selected.

In a preferred embodiment of the present invention, the base station is notified of the result of monitoring by the mobile terminal when the field strength of reception as monitored by the mobile terminal drops below a predetermined level, whereupon the base station switches the frequency used in its transmission from the third frequency to the first frequency, switches the frequency used in its reception from the fourth frequency to the second frequency, and issues an instruction to the mobile terminal, by which instruction the frequencies used by the mobile terminal are switched from the third and fourth frequencies to the first and second frequencies.

In another embodiment, the mobile terminal has a monitoring means for monitoring the field strength of the transmission of a radio signal having the first or third frequency; the field strength of the radio signal monitored by the monitoring means is forwarded to the control apparatus provided either in the base station or in the switching station; and the control apparatus instructs the base station to switch the frequency used in communication.

In still another embodiment, the mobile terminal has a monitoring means for monitoring the field strength of all the transmissions from the base station; the data indicative of the field strength is forwarded to the control apparatus provided either in the base station or in the switching station; the control apparatus instructs, on the basis of the field strength of the radio signal having either the first or third frequency and contained in the data, the base station and the mobile terminal to switch the frequency used in communication.

In still another embodiment, the base station adds, to the radio signal having the third frequency, either an identification signal indicating that the transmission is from the base station having the overlay region, or an identification signal indicating that the signal is intended for the overlay region.

Other objects and further features of the present invention will be apparent from the following detailed descriptions when read in conjunction with the accompanied drawings.

BRIEF DESCRIPTION OF THE DRAWINGS

FIG. 1(A) illustrates the service area used in the conventional digital mobile telephone system of a cellular type;

FIG. 1(B) illustrates a signal format used in the system of FIG. 1(A);

FIG. 2 is a block diagram showing the configuration of the conventional digital mobile telephone system of a cellular type;

BEST MODE OF CARRYING OUT THE INVENTION

A description will be now given of the referred embodiments of the present invention, with reference to the figures.

Figure 3:
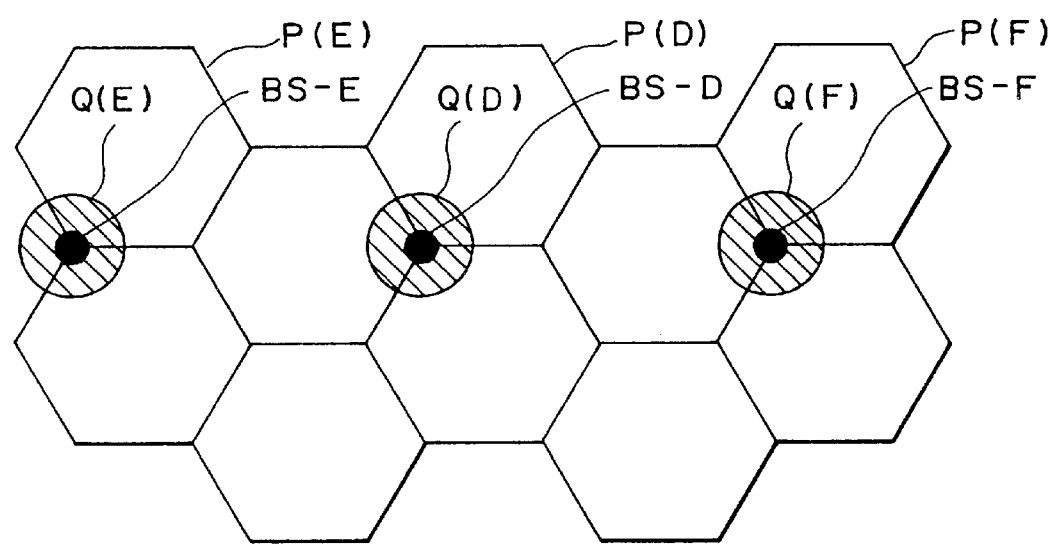
FIG. 3 illustrates the service area of the digital mobile telephone system of a cellular type having overlay regions.
Figure 4:
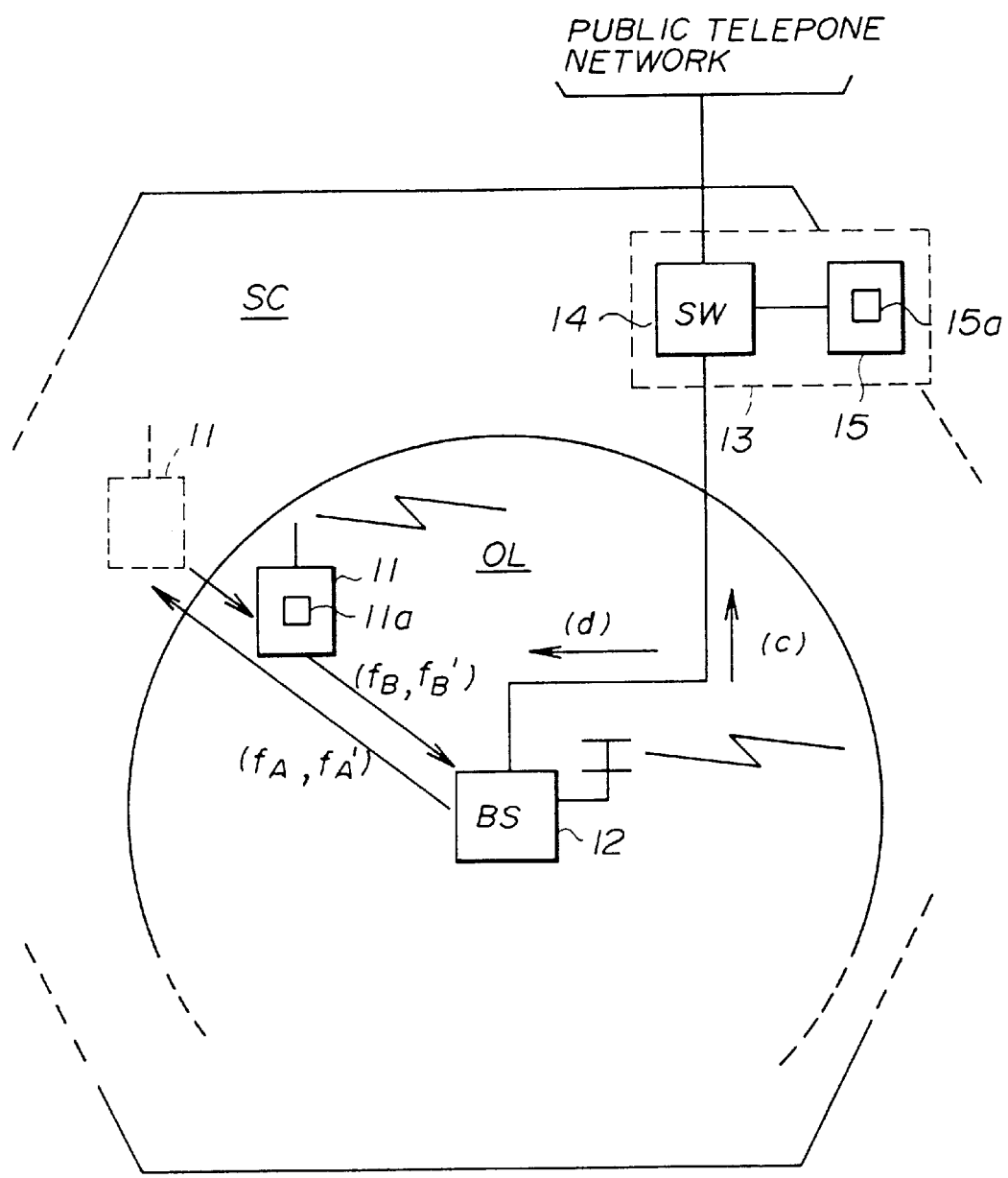
FIG. 4 is a block diagram illustrating the schematic configuration of the digital mobile telephone system according to an embodiment of the present invention.

FIG. 4 illustrates the digital mobile telephone system according to the first embodiment of the present invention;

In the figure, a base station 12 is provided in correspondence to a sector SC corresponding to the sector P of FIG. 3 and to an overlay region OL corresponding to the overlay region Q. The base station 12 is connected to the public telephone line via a switching apparatus 14 provided in a switching station 13. Further, a mobile terminal 11 is provided in such a manner that it can move within the sector SC including the overlay region OL and into the sectors of other base stations. When in operation inside the sector SC of the base station 12, the mobile terminal 11 is connected to the public telephone line via the base station 12; and a control apparatus 15 corresponding to the control apparatus 3b of FIG. 2 is provided in the switching station 13 for the purpose of effecting switching control of frequencies used in communication between the base station and the mobile terminal. The control apparatus 15 performs switching control of the communication frequency when the mobile terminal 11 moves in and out of the sector SC, in the same manner as in FIG. 2.

More specifically, when the mobile terminal 11 is located outside the overlay region OL but inside the sector SC, as shown by a broken line in FIG. 4, the base station 12 transmits to the mobile terminal 11 at a first frequency $f_A$ characterizing the sector SC, and receives transmissions from the mobile terminal 11 at a second frequency $f_B$ also characterizing the sector SC. The frequencies $f_A$ and $f_B$ will be called sector frequencies hereinafter in this specification. The mobile terminal 11 of FIG. 4 contains a field strength measuring device 11a for measuring the field strength of the received radio wave, and the device 11a measures the field strength of the wave having the sector frequency $f_A$. When the field strength measured drops below a predetermined threshold level, the device searches the service area for the base station producing the greatest field strength. The information, relating to the base station producing the greatest field strength thus determined by a search, is forwarded to the control apparatus 14 of the switching station 13 via the base station 12; and the control apparatus 14 switches, via the switching station 13, the frequency used on a communication channel between the base station 12 and the mobile terminal 11 to the frequency, used in communication with the base station, which produces the greatest field strength. Such switching control of the frequency is performed in the conventional system, too.

In the digital telephone system of this embodiment, the field strength measuring device 11a monitors whether or not the field strength of a transmission from the base station 12 using the first sector frequency $f_A$ exceeds a predetermined threshold level $TH_1$, and, when it is found that the above strength exceeds the above level, sends a signal c indicating that fact to the control apparatus 15 of the switching station 13 via the base station 12. The predetermined threshold level $TH_1$ is preset to correspond to the boundary of the overlay region SC. That is, when the mobile terminal 11 moves into the overlay region OL within the sector SC as it approaches the base station 12, the field strength of the signal received by the terminal 11 and having the sector frequency $f_A$ exceeds the threshold level $TH_1$, thus making it possible to determine whether or not the mobile terminal 11 is in operation inside the overlay region OL, by measuring field strength of the received signal having the sector frequency $f_A$.

In the system of FIG. 4, the control apparatus contains a control unit 15a, and the control unit 15a sends, in response to the signal c, a control signal d to the base station 12, by which signal d the transmission frequency and the reception frequency of the base station 12 are switched from the first frequency $f_A$ and the second frequency $f_B$ respectively, to the transmission frequency $f_A'$ and the reception frequency $f_B'$, respectively, for the overlay region. The frequencies $f_A'$ and $f_B'$ are called overlay frequencies hereinafter in this specification.

Figure 5:
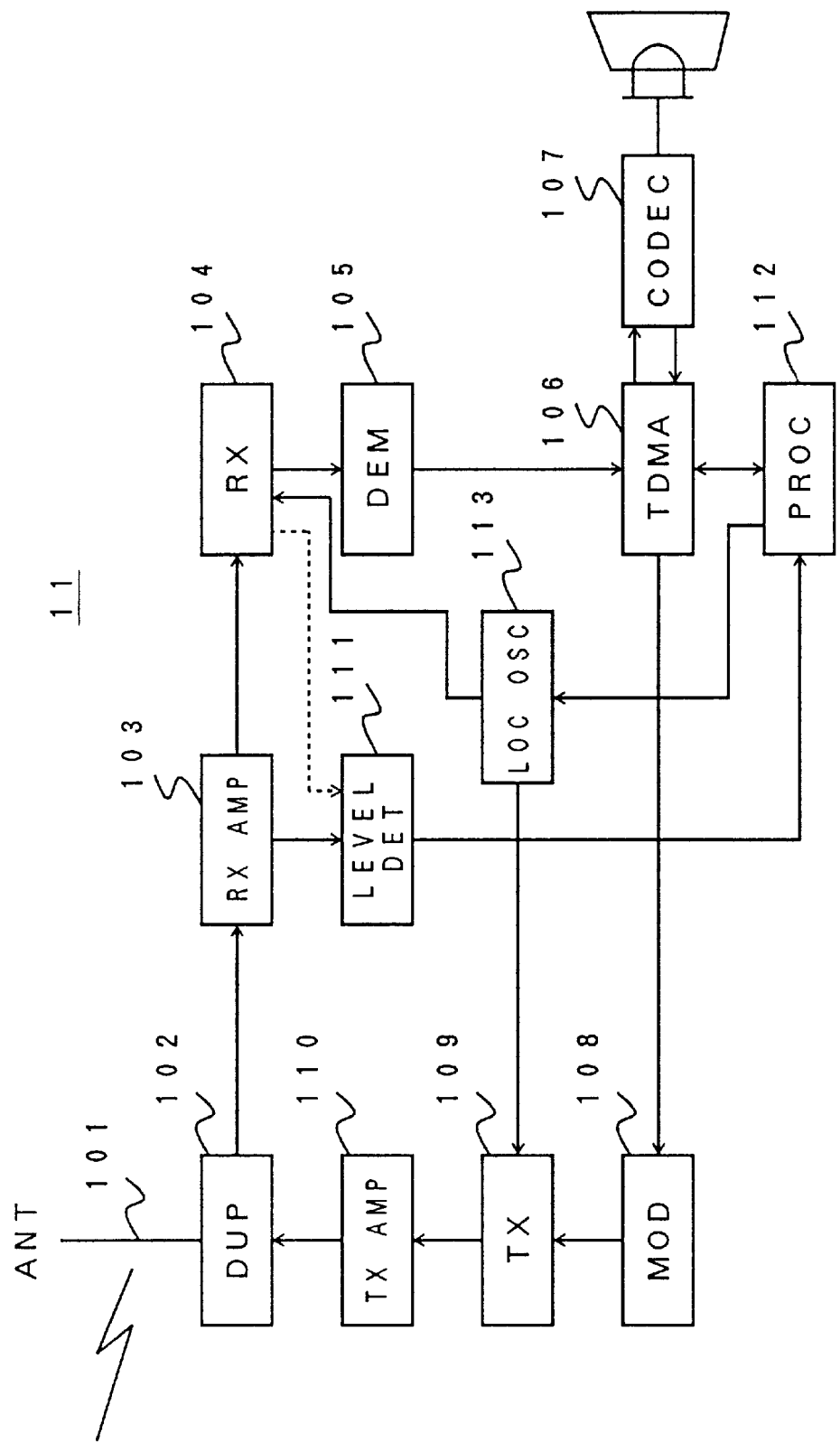
FIG. 5 is a block diagram illustrating the configuration of the mobile terminal used in the system of FIG. 4.

FIG. 5 is a block diagram showing the concrete configuration of the mobile terminal 11 of FIG. 4.

Referring to FIG. 5, the mobile terminal 11 comprises an antenna 101 and an antenna sharing unit 102 for sharing the antenna in the transmission system and reception system. First, the reception system will be described. A transmission at the sector frequency $f_A$ from the base station 12 received by the antenna 101 is sent from the antenna sharing unit 102 to a RF amplifier 103 and amplified thereby, after which the same signal is sent to a receiving unit 104 and converted to an IF signal. As in the ordinary heterodyne detection, the receiving unit 104 is supplied, by a local oscillator 113, with a local signal preset to selectively receive the frequency $f_A$. The IF signal thus obtained is converted to a base band signal by a decoder 105, and is sent to a time division multiplexing access unit 106. The unit 106 extracts, under the control of a processor 12 and by means of time division multiplexing, a signal on a communication channel whose destination is the mobile terminal 11, for example, on the channel $TCH_1$, sends the extracted signal to a CODEC 107, and subjects the signal to D/A conversion in order to retrieve a speech signal.

The transmission system shares the CODEC 107 and the time division multiplexing access unit 106 with the reception system, in which transmission system the CODEC 107 generates a digital speech signal by subjecting an input speech signal to A/D conversion, and the time division multiplexing access unit 106 generates a base band signal by subjecting such digital speech signal to time division multiplexing. The IF signal is modulated in accordance with the base band signal thus generated by means of a coder 108, and the modulated IF signal is converted to a transmitted signal having the sector frequency $f_B$ by a transmitting unit 109, and this signal is then sent to the antenna via the antenna sharing unit 102 after being amplified by a power amplifier 110, and is transmitted to the base station 12. The local oscillator 113 supplies, to the transmitting unit, a local signal having a frequency preset such that the frequency of the transmitted signal may be $f_B$.

The mobile terminal 11 of FIG. 5 comprises a level detecting unit 111 for detecting the level of a received signal in collaboration with the RF amplifier 103 or the receiving unit 104, and the level detecting unit 111 sends an output signal indicative of the detected level to the processor 112. The level detecting unit 111 detects the field strength of a received signal, by means of, for example, an AGC signal. The processor 112 compares the output signal from the unit 111 with a signal having a predetermined threshold level corresponding to the threshold level $TH_1$, and, when the output signal exceeds the predetermined threshold value, in other words, when the field strength level of the received signal exceeds threshold value $TH_1$, controls the time division multiplexing unit 106 and consigns, to the control channel CCH, the information indicating that the mobile terminal 11 has moved into the overlay region OL of the base station 12. Such information is consigned to a B channel constituting a part of the control channel CCH, as a single or multiple-bit binary code.

Figure 6:
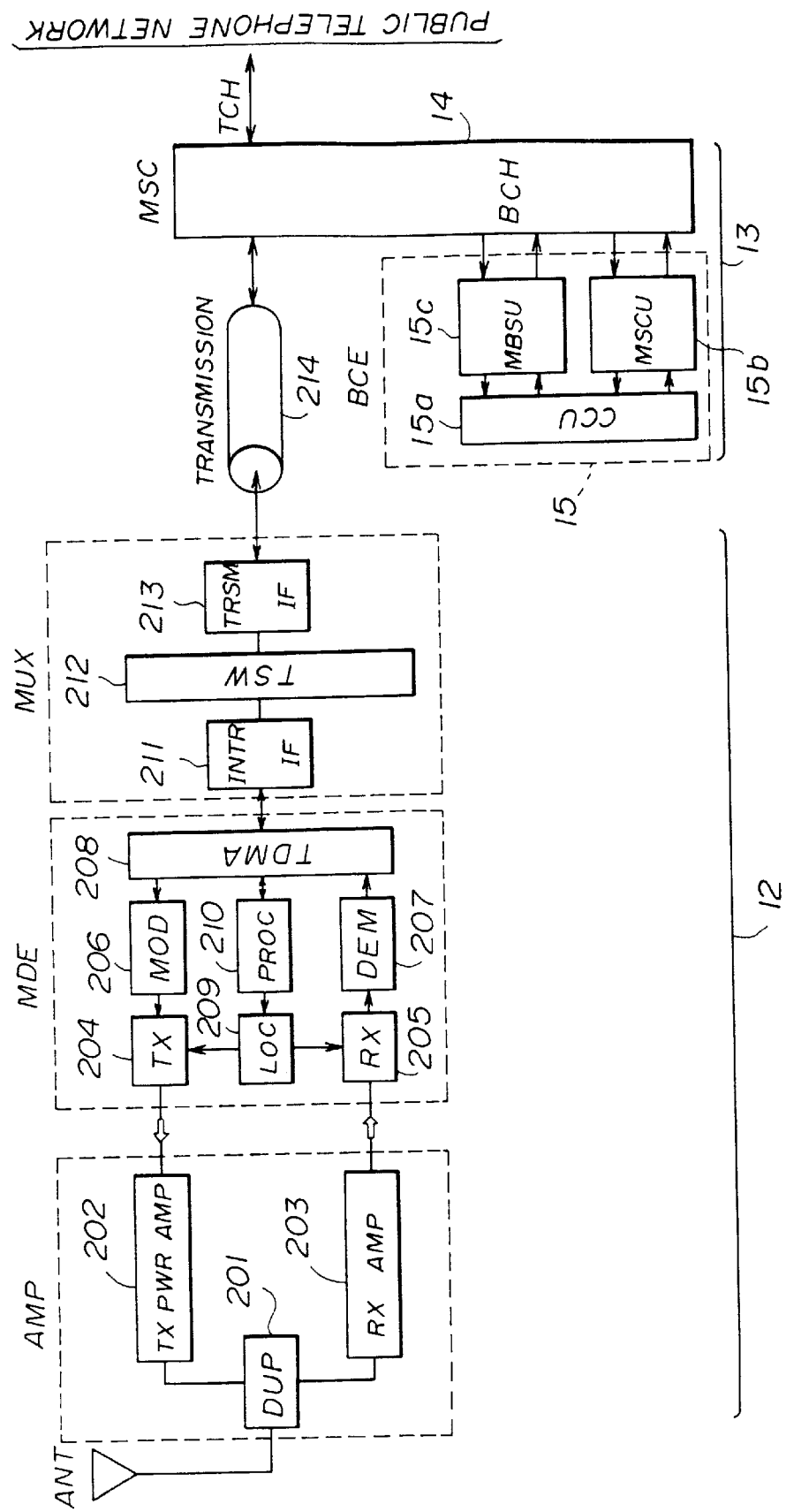
FIG. 6 is a block diagram illustrating the configuration of the base station and the switching station used in the system of FIG. 4.

FIG. 6 illustrates the configuration of the base station 12 and the switching station 13 shown in FIG. 4.

Referring to FIG. 6, the base station 12 comprises: an amplifying portion AMP connected to an antenna ANT; a coding/decoding portion MDE connected to the amplifier AMP; and a multiplexing interface portion MUX connected to the coding/decoding portion MDE and serving as an interface between: a multiplexed line linking the base station 12 and the switching station 13; and the base station. The amplifying portion AMP comprises: an antenna sharing unit 201 physically connected to the antenna; a transmission power amplifier 202 connected to the antenna via the unit 201 and generating a large-power transmitted signal having the frequency $f_A$ by being supplied with a signal having the sector frequency $f_A$ and amplifying the same signal; low-noise high-frequency amplifier 203 connected to the antenna also via the unit 201, amplifying a radio signal having the sector frequency $f_B$ received by the antenna, and raising the S/N ratio thereof. The coding/decoding portion MDE comprises: a transmitting unit 204 being supplied with an intermediate frequency signal and converting the same to the radio signal having the frequency $f_A$ transmitted via the power amplifier 202; a receiving unit 205 being supplied with an output signal having the frequency $f_B$ from the low-noise high-frequency amplifier 203 and converting the same to an intermediate frequency signal; a modulator 206 being supplied with a digital base band signal which has undergone time division multiplexing and generating, by coding the same, an intermediate frequency signal transmitted by the transmitting unit 204; a demodulator 207 being supplied with the intermediate frequency signal output from the receiving unit 205 and, by decoding the same, generating the digital base band signal which has undergone time division multiplexing; and a time division multiplexing access unit 208 being supplied with the digital base band signal by the multiplexing interface portion MUX, subjecting the same to time division multiplexing, generating the time division multiplexed digital base band signal, supplying the same to the modulator 206, and reproducing the digital base band signal by subjecting the output signal from the demodulator 207 to time division multiplexing. The time division multiplexing access unit 208 performs time division multiplexing as shown in FIG. 1.

The coding/decoding portion MDE further comprises: a local oscillator 209 supplying a local signal having respective frequencies to both the transmitting unit 204 and the receiving unit 205 and controlling the operating frequencies $f_A$ and $f_B$; and a processor 210 for controlling the operating frequencies of the local oscillator 209. The time division multiplexing access unit 208 extracts the control signal transmitted from the switching station 13 via the multiplexing interface portion MUX, which control signal is derived from a time division multiplexing on the basis of the digital base band signal, and supplies the extracted signal to the processor 210. In other words, the operating frequencies of the transmitting unit 204 and the receiving unit 205 are switched, in accordance with the control signal sent from the switching station 13 via the multiplexing interface portion MUX, between a first pair ($f_A$, $f_B$) corresponding to the sector frequencies and a second pair ($f_A'$, $f_B'$) corresponding to the overlay frequencies.

The multiplexing interface portion MUX comprises: a first interface unit 211 connected to the time division multiplexing access unit 208; a transmission speed conversion unit 212 connected to the time division multiplexing access unit 208 via the first interface unit 211 and effecting transmission speed conversion; and a second interface unit 213 connected to transmission channel 214 and serving as an interface between the unit 212 and the transmission channel 214.

A description will now be given of the configuration of the switching station 13.

Referring to FIG. 6 again, the switching station 13 comprises: the switching apparatus 14 described with reference to FIG. 4 and connected to the public telephone line; and the control apparatus 15 for controlling the switching apparatus 14. The switching apparatus 14 connects communication channels, for example, $TCH_1$ or $TCH_2$, which are contained in the signal transmitted along the line linking the switching apparatus and the mobile terminal 11, to the public telephone line under the control of the control apparatus 15. The control apparatus 15 comprises the control unit 15a for effecting the above control, and the control unit 15a controls the exchange apparatus 14 via the interface unit 15b. Thus, connection is established between a terminal on the public telephone line and the predetermined mobile terminal 11.

The system of FIG. 6 further comprises another interface unit 15c that interfaces between the switching apparatus 14 and the control unit 15a, and the interface unit 15c extracts, from the signal transmitted along the control channel CCH described with reference to FIG. 1(B), the information indicating that it is found, through the monitoring by the mobile terminal 11, that the field strength of the transmission from the base station 12 at the sector frequency $f_A$ exceeds the predetermined threshold level, and forwards that information to the control unit 15a. The control unit 15a sends, in response to such information relating to the field strength, an instruction, by which the transmission frequency $f_A$ and the reception frequency $f_B$ of the base station are switched to the overlay frequencies $f_A'$, $f_B'$, to the switching apparatus 14 via the interface unit 15c. The switching apparatus 14 forwards that instruction to the base station 12 via the transmission channel 214. The base station 12 extracts the instruction by means of the time division multiplexing access unit 208, and sends it to the processor 210, the processor 210 then executing a change to the desired frequency by controlling the local oscillator 209.

Upon this frequency change, the base station 12 sends an instruction to the mobile terminal via the control channel, by which instruction the reception frequency of the mobile terminal 11 is switched from the sector frequency $f_A$ to the overlay frequency $f_A'$, and the transmission frequency thereof is switched from the sector frequency $f_B$ to the overlay frequency $f_B'$. The mobile terminal 11 extracts that instruction from the control channel CCH by means of the time division multiplexing unit 106, and forwards the instruction to the processor 112. The processor 112 controls the local oscillator 113 and changes the frequency of the local signal supplied to the receiving unit 104 and the transmitting unit 109, such that the frequency received by the receiving unit 104 becomes $f_A'$ and the frequency transmitted by the transmitting unit 109 becomes $f_B'$.

A summarized description of the switching control of the frequencies in the system of the present invention will be given with reference to the flow chart of FIG. 7.

Figure 7:
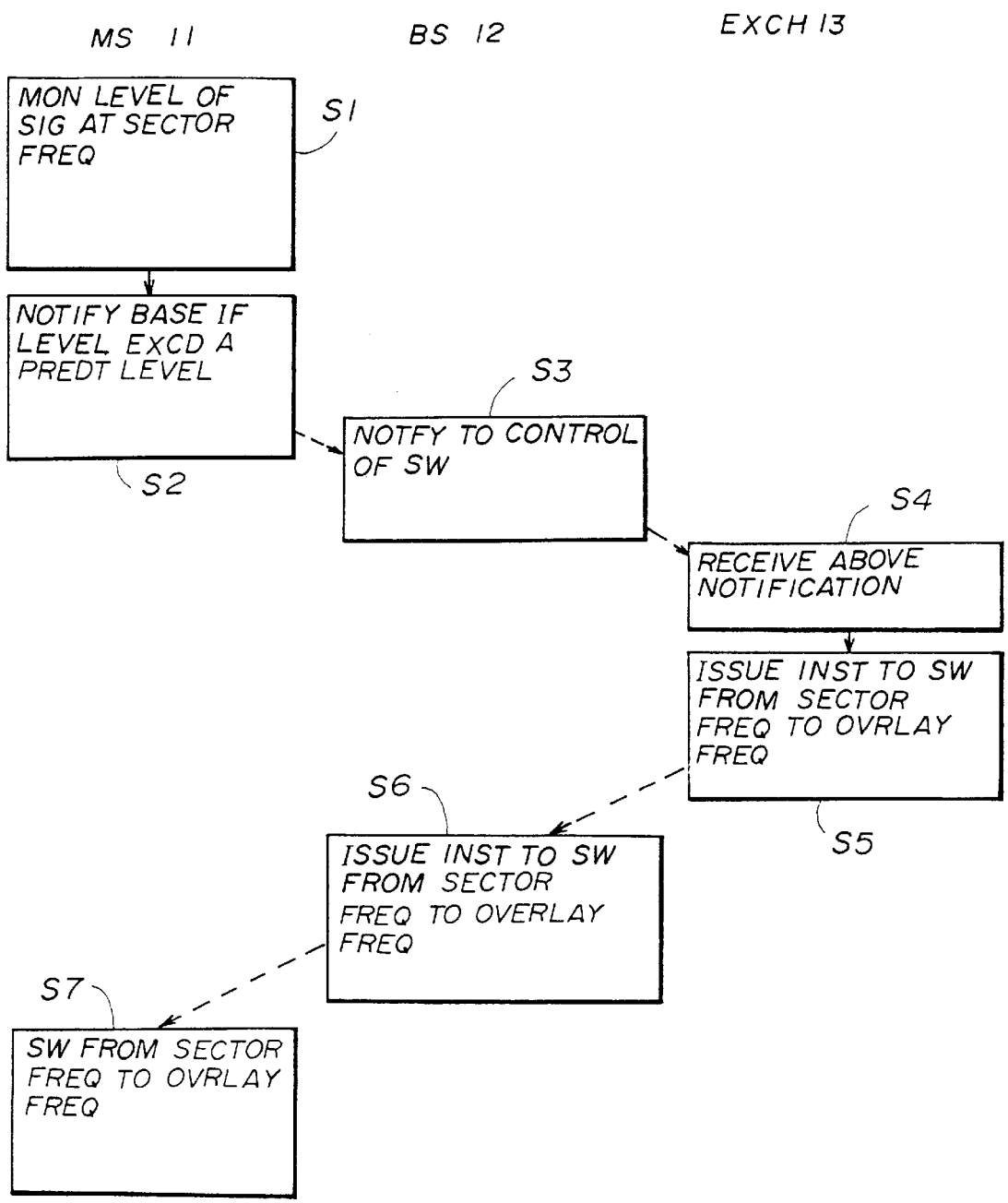
FIG. 7 describes the frequency switching operation, of the mobile terminal and the base station, effected when the mobile terminal moves from the sector into the overlay region in the first embodiment of the present invention.

Referring to FIG. 7, in step S1, the mobile terminal 11 monitors, by means of the processor 112, whether or not the level of the received signal having the sector frequency $f_A$, which signal is detected by the level detecting unit 111, exceeds the predetermined threshold level corresponding to the threshold field strength level $TH_1$ described earlier. When it is found that the above level exceeds the above threshold level, step S2 is executed, and the base station 12 is notified of the fact that the received signal level has exceeded the predetermined threshold level, via the control channel CCH contained in a signal having the frequency $f_B$. More specifically, the processor 112 of the mobile terminal 11 outputs, to the time division multiplexing access unit 106, the information indicating that the level of the received signal having the sector frequency $f_A$ has exceeded the predetermined threshold level. The unit 106 consigns that information to the control channel contained in the signal having the sector frequency $f_B$. The base station 12 receives, in step S3, the information thus sent, and passes the same to the control unit 15a in the switching station 13 via the transmission channel 214 and the interface unit 15c. The control unit 15a, receiving same information in step S4, issues, in step S5, an instruction by which the transmission frequency is switched from the sector frequency $f_A$ to the overlay frequency $f_A'$, and the reception frequency is switched from the sector frequency $f_B$ to the overlay frequency $f_B'$, and transmits this instruction to the base station 12 via the interface unit 15c and the transmission channel 214. Moreover, in step S6, the base station 12 sends an instruction to the mobile terminal 11 via the control channel CCH, by which instruction the reception frequency of the mobile terminal is switched from the sector frequency $f_A$ to the overlay frequency $f_A'$, and the transmission frequency thereof is switched from the sector frequency $f_B$ to the overlay frequency $f_B'$. The mobile terminal 11 receives, in step S7, this instruction via the time division multiplexing access unit 106, and switches its transmission frequency and the reception frequency from the sector frequencies to the overlay frequencies.

Figure 8:
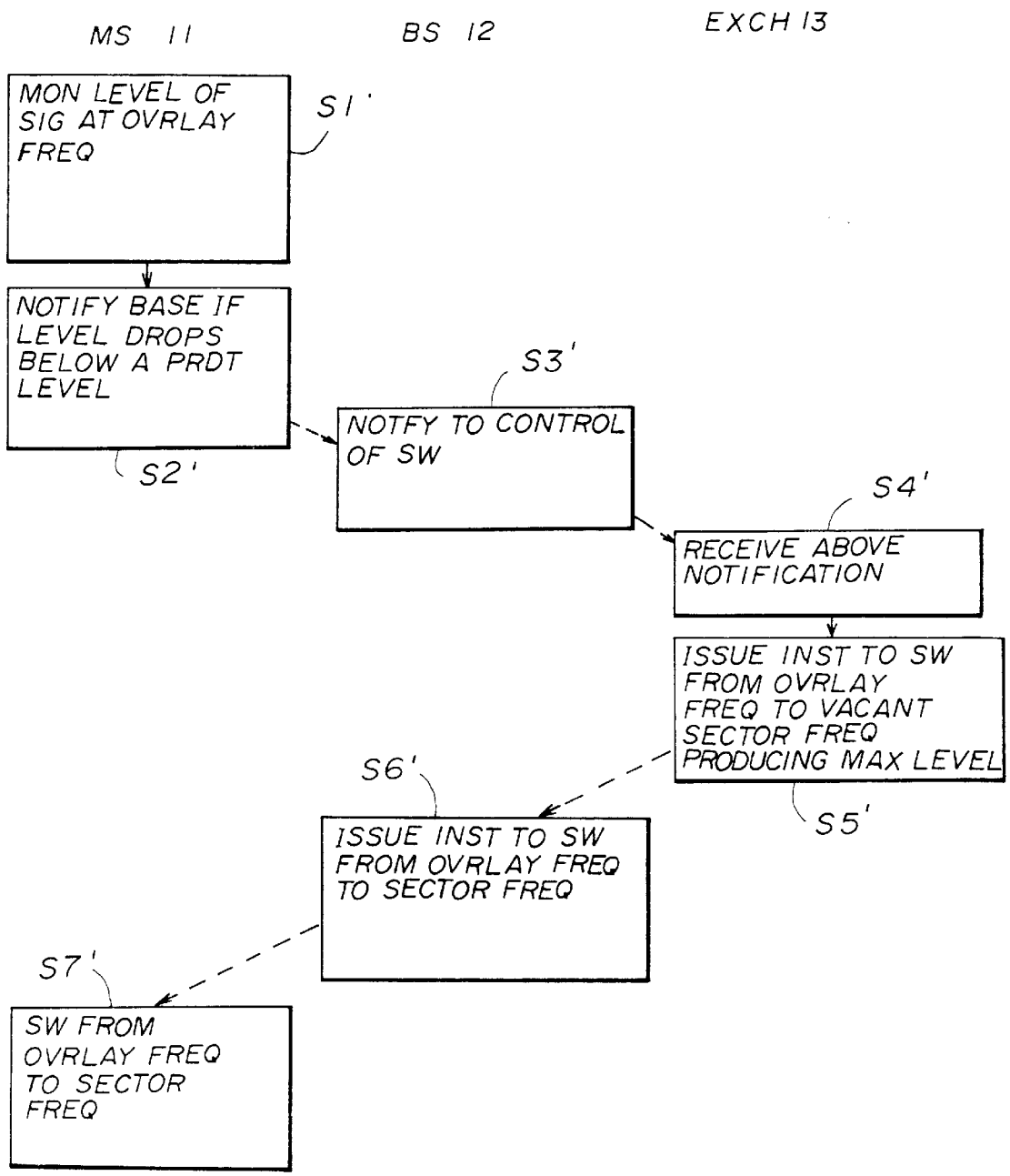
FIG. 8 describes the frequency switching operation, of the mobile terminal and the base station, effected when the mobile terminal moves from the overlay region into the sector in the first embodiment of the present invention.

FIG. 8 represents the frequency control effected, when the mobile terminal 11 moves out of the overlay region OL, in the first embodiment of the present invention, which embodiment has the configuration shown in FIGS. 5 through 7.

Referring to FIG. 8, in step S1' corresponding to step S1 of FIG. 7, the processor 112 of the mobile terminal 11 monitors the field strength of the signal having the overlay frequency $f_A'$ and transmitted from the base station 12. When it is detected that the field strength of the transmitted signal drops below the level corresponding to the threshold field strength level $TH_2$ characterizing the boundary of the overlay region, the processor 112 consigns, in step S2', the information indicative of that fact to the control channel contained in the transmitted signal having the frequency $f_B'$, via the time division multiplexing access unit 106 so that the base station 12 may be notified. Since the overlay region is defined in accordance with transmission of a low-power radio signal having the frequency $f_A'$, the threshold field strength level $TH_2$ is generally lower than the threshold field strength level $TH_1$ of the transmitted signal having the sector frequency $f_A$.

In step S3' corresponding to step S3 of FIG. 7, the base station 12 forwards the information sent from the mobile terminal 11 to the switching station 13 via the transmission channel 214. The switching station 13 receives the information in step S4' corresponding to step S4 and sends the same to the control unit 15a via the interface unit 15c, the control unit 15a then issuing an instruction by which the transmission frequency of the base station 12 is switched from $f_A'$ to the vacant frequency $f_A$ and the reception frequency of the base station 12 is switched from $f_B'$ to the vacant frequency $f_B$. This instruction is returned, in step S6' corresponding to step S6, from the switching station 13 to the base station 12 via the transmission channel 214, whereupon the base station 12 switches its transmission frequency from $f_A'$ to $f_A$ and switches its reception frequency from $f_B'$ to $f_B$. At the same time as this, the base station 12 sends an instruction to the mobile terminal 11 via the control channel, by which instruction the reception frequency is switched from $f_A'$ to $f_A$ and the transmission frequency is switched from $f_B'$ to $f_B$. The processor 112 in the mobile terminal 11 extracts, in step S7' corresponding to S7, this instruction via the time division multiplexing access unit 106, and executes the instructed frequency change.

A description will next be given of the second embodiment of the present invention.

Figure 9:
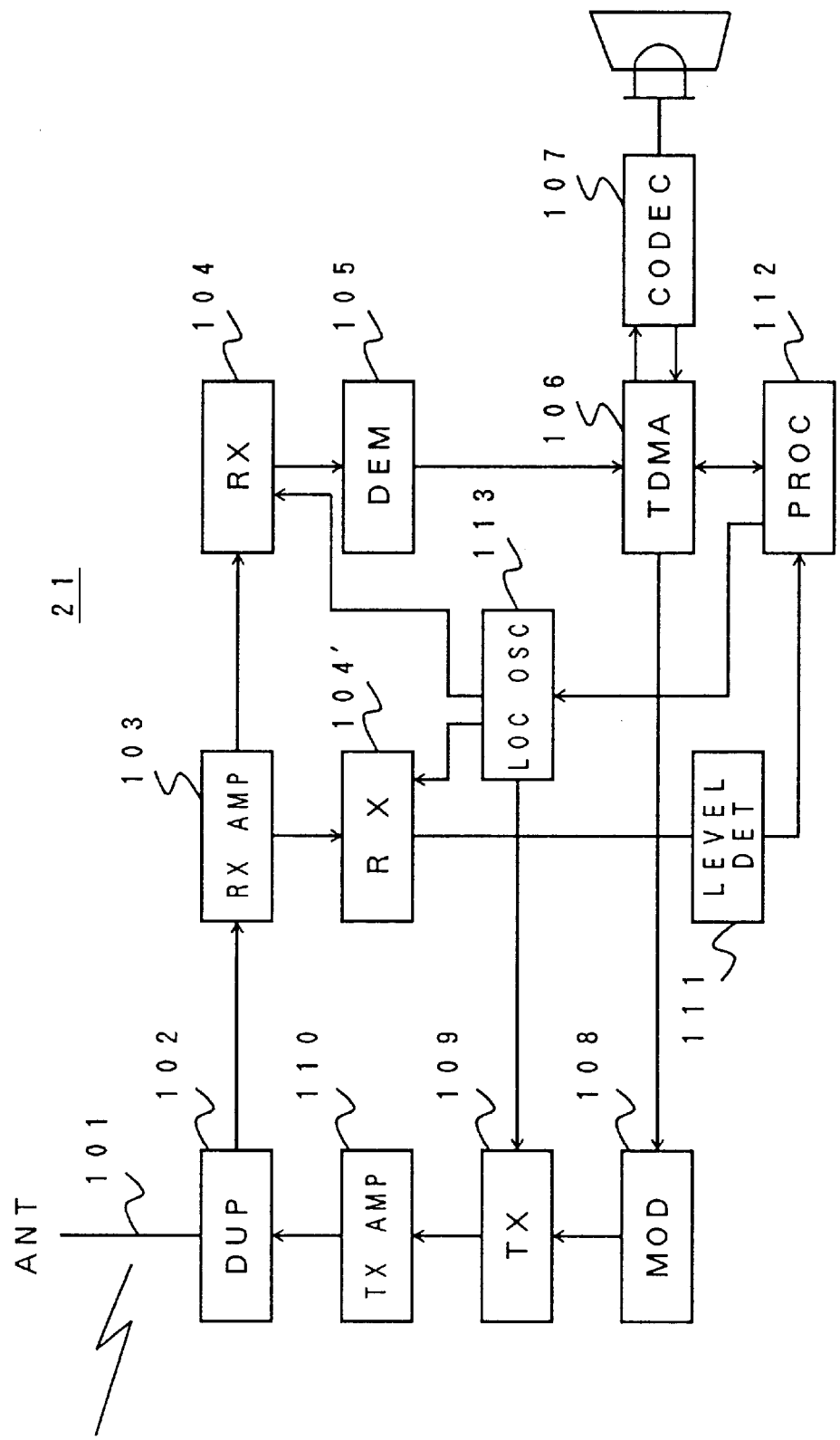
FIG. 9 is a block diagram illustrating the configuration of the mobile terminal used in the second embodiment of the present invention.

FIG. 9 shows the configuration of a mobile terminal 21 used in the second embodiment of the present invention.

Referring to FIG. 9, the mobile terminal 21 is provided, aside from the receiving unit 104, with a receiving unit 104' which unit is supplied with an output signal from the low-noise amplifier 103 and converts the same signal to an intermediate frequency signal. The receiving unit 104' is supplied, by the local oscillator 113, with a local signal having a frequency different from that of the local signal supplied to the receiving unit 104. As a result of this, the receiving unit 104' is tuned to a frequency different from that of the receiving unit 104. Further, the frequency of the local signal supplied to the receiving unit 104' is controlled by the processor 112. In this embodiment, the level of the signal transmitted from the base station 12 is detected by using an output signal from the receiving unit 104'. It is also to be noted that, in this embodiment, an identifying signal SIG1, indicating that the base station 12 has an overlay region OL, is added to the signal transmitted from the base station 12 at the frequency $f_A$; and a second identifying signal SIG2 is added to the signal transmitted from the base station 12 at the frequency $f_A'$, to indicate that the transmission covers the overlay region OL.

Figure 10:
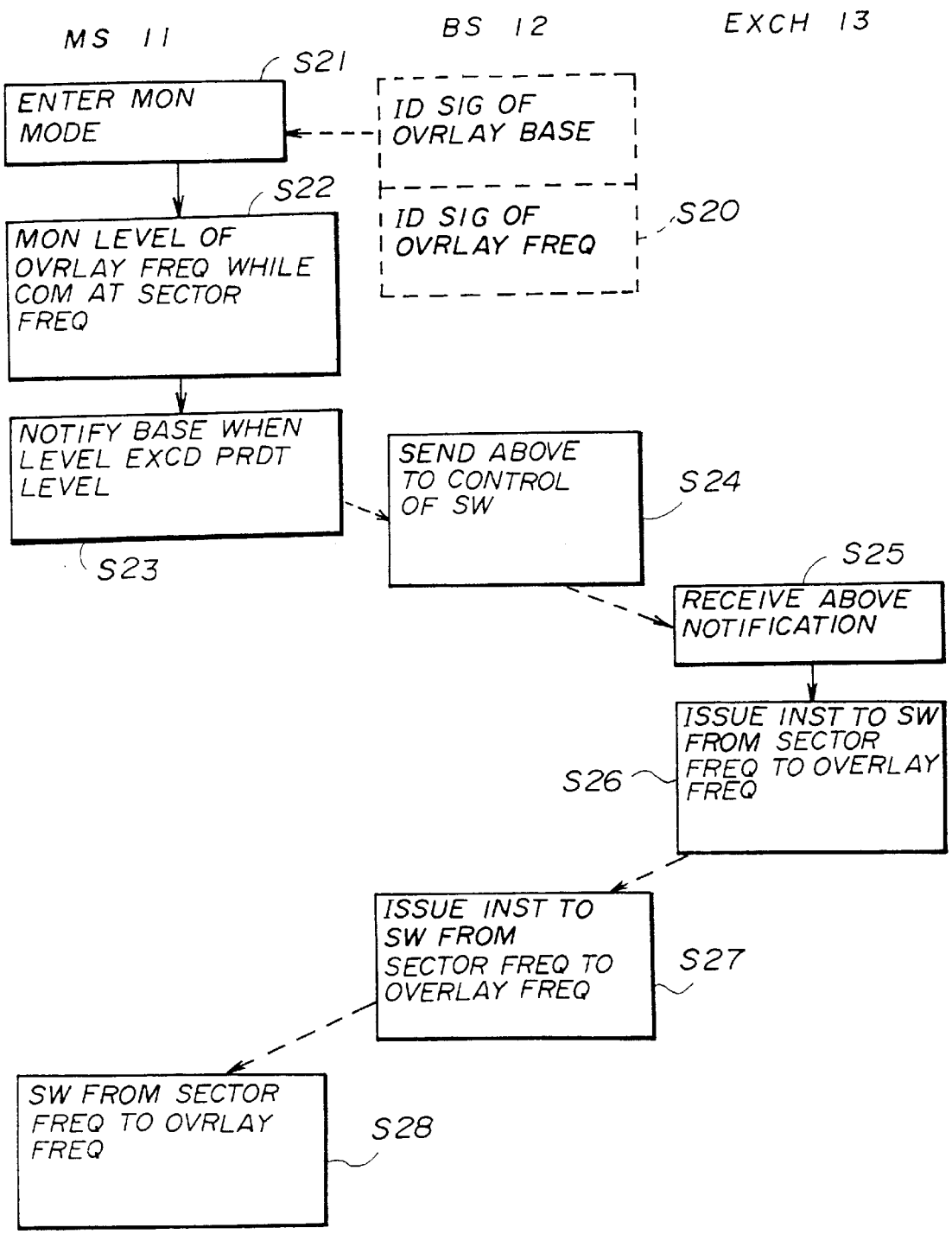
FIG. 10 describes the frequency switching operation, of the mobile terminal and the base station, effected when the mobile terminal moves from the sector into the overlay region in the second embodiment of the present invention.

FIG. 10 shows the frequency switching control according to this embodiment.

Referring to the flow chart of FIG. 10, in step S20, the base station adds the identifying signal SIG1, indicating that the base station 12 has an overlay region, to its transmission signal having the frequency $f_A$, adding also the identifying signal SIG2, indicating that the signal transmitted covers the overlay region, to the transmission signal having the frequency $f_A'$ and covering the overlay region. These identifying signals SIG1, SIG2 are consigned to the control channels carried by respective frequencies, via, for example, the processor 210 or the time division multiplexing access unit 208 of the base station 12.

In step S21, the mobile terminal 11 allows, upon entering into communication with the base station 12 at the frequencies $f_A$ and $f_B$, the processor 112 to determine whether or not the identifying signal SIG1 is included in the signal transmitted from the base station 12 at the frequency $f_A$. If it is found that the identifying signal SIG1 is included in the signal transmitted at the frequency $f_A$, the mobile terminal 11 monitors, in step S21, the field strength of the transmission from the base station 12 to the overlay region at the frequency $f_A'$ as received by the receiving unit 104', while at the same time maintaining the communication at the sector frequency $f_A$, $f_B$. When it is found that the level of the received signal exceeds a predetermined level corresponding to the threshold field strength level $TH_2$, the processor 112 of the mobile terminal 11 consigns, via the time division multiplexing unit 106, the information indicative of that fact to the control channel contained in the signal transmitted at the frequency $f_B$ from the mobile terminal 11 to the base station 12.

In response to the transmission from the mobile terminal 11 in step S23, the base station 12 executes step S24 corresponding to step S4 of FIG. 7, and forwards the information to the switching station 13. The switching station 13, upon receipt of this information in step S25, forwards the same to the control unit 15a of the switching apparatus 14 via the interface 15c. In step S26, the control unit 15a issues an instruction by which the transmission frequency of the base station 12 is switched from $f_A$ to $f_A'$ and the reception frequency thereof is switched from $f_B$ to $f_B'$, and forwards the instruction to the base station 12 via the interface unit 15c and the transmission channel 214. In accordance with this instruction, the base station 12 switches, in step S27, the transmission frequency from $f_A$ to $f_A'$ and switches the reception frequency from $f_B$ to $f_B'$. Then, in step S28, the mobile terminal 11 switches, in accordance with the instruction sent via the base station, the reception frequency from $f_A$ to $f_A'$ and switches the transmission frequency from $f_B$ to $f_B'$.

Figure 11:
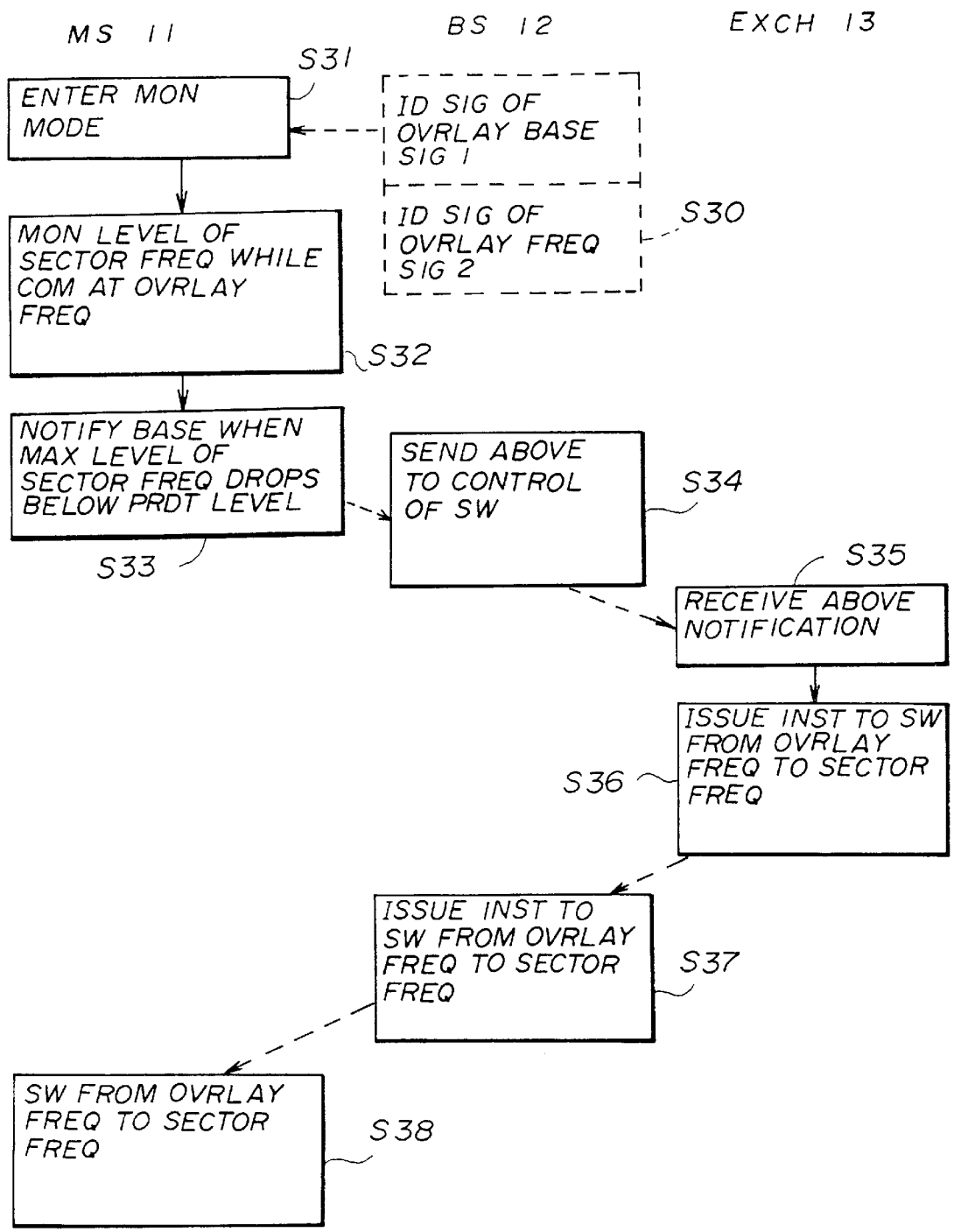
FIG. 11 describes the frequency switching operation, of the mobile terminal and the base station, effected when the mobile terminal moves from the overlay region into the sector in the second embodiment of the present invention.

FIG. 11 shows the switching control of the frequency used in communication between the base station 12 and the mobile terminal 11 effected in this embodiment when the mobile terminal 11 moves out of the overlay region OL.

Referring to FIG. 11, the base station 12 adds, in step S30, as in step S20, the identifying signal SIG1 to the signal transmitted at the sector frequency $f_A$ as well as adding the identifying signal SIG2 to the signal transmitted at the overlay frequency $f_A'$. In step 32, the mobile terminal 11 monitors the field strength of the transmission from the base station at the sector frequency $f_A$ while communicating with the base station 12 at the overlay frequencies $f_A'$, $f_B'$ in step 31 corresponding to step 21. It is generally practiced that the transmission from the base station covering the sector SC shown in FIG. 4 uses not only the frequency $f_A$ alone but a plurality of frequencies, and the level is monitored for each of these frequencies in step S32.

When the level of the highest-level signal transmitted from the base station 12, which level is monitored in step S32, drops below the level corresponding to the threshold field strength level $TH_1$, the mobile terminal 11 sends, in step S38, the information indicating that fact to the base station 12 via the control channel carried by the transmission frequency $f_B'$; and the base station 12 forwards, in step S34, the same information to the switching station 13 via the transmission channel 214. After receiving the information from the base station 12 in step S35, the switching station 13 forwards the same to the control unit 15a via the interface 15c; the control unit 15a issues an instruction by which the frequency used in transmission from the base station 12 is switched from the overlay frequency $f_A'$ to the sector frequency $f_A$ and the frequency used in reception by the base station 12 is switched from the overlay frequency $f_B'$ to the sector frequency $f_B'$, and sends the instruction to the base station 12, as in the aforementioned embodiment. The base station 12 switches, in step S37, the frequencies in accordance with this instruction; and, in step S38, the mobile terminal 11 switches, in correspondence to the frequency switching in the base station 12, the reception frequency from the overlay frequency $f_A'$ to the sector frequency $f_A$ and switches the transmission frequency from the overlay frequency $f_B'$ to the sector frequency $f_B$.

A description will now be given of the third embodiment of the present invention, with reference to FIGS. 12 and 13. In this embodiment of the present invention, the monitoring of the level of the signal transmitted from the base station 12 and received by the mobile terminal 11 is effected not by the processor 112 of the mobile terminal 11 but by the control unit 15a of the switching station 13.

Figure 12:
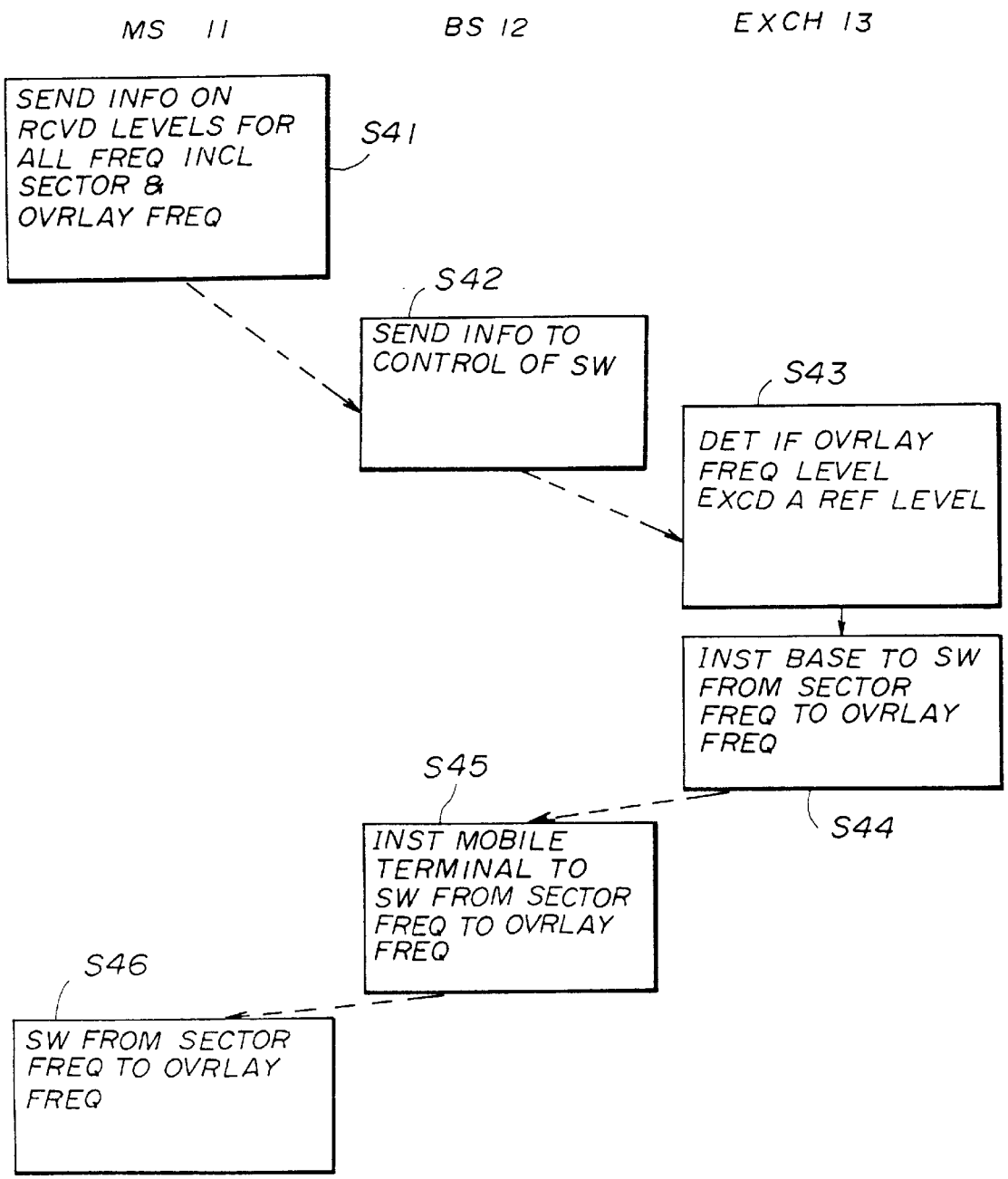
FIG. 12 describes the frequency switching operation, of the mobile terminal and the base station, effected when the mobile terminal moves from the sector into the overlay region in the third embodiment of the present invention.
Figure 13:
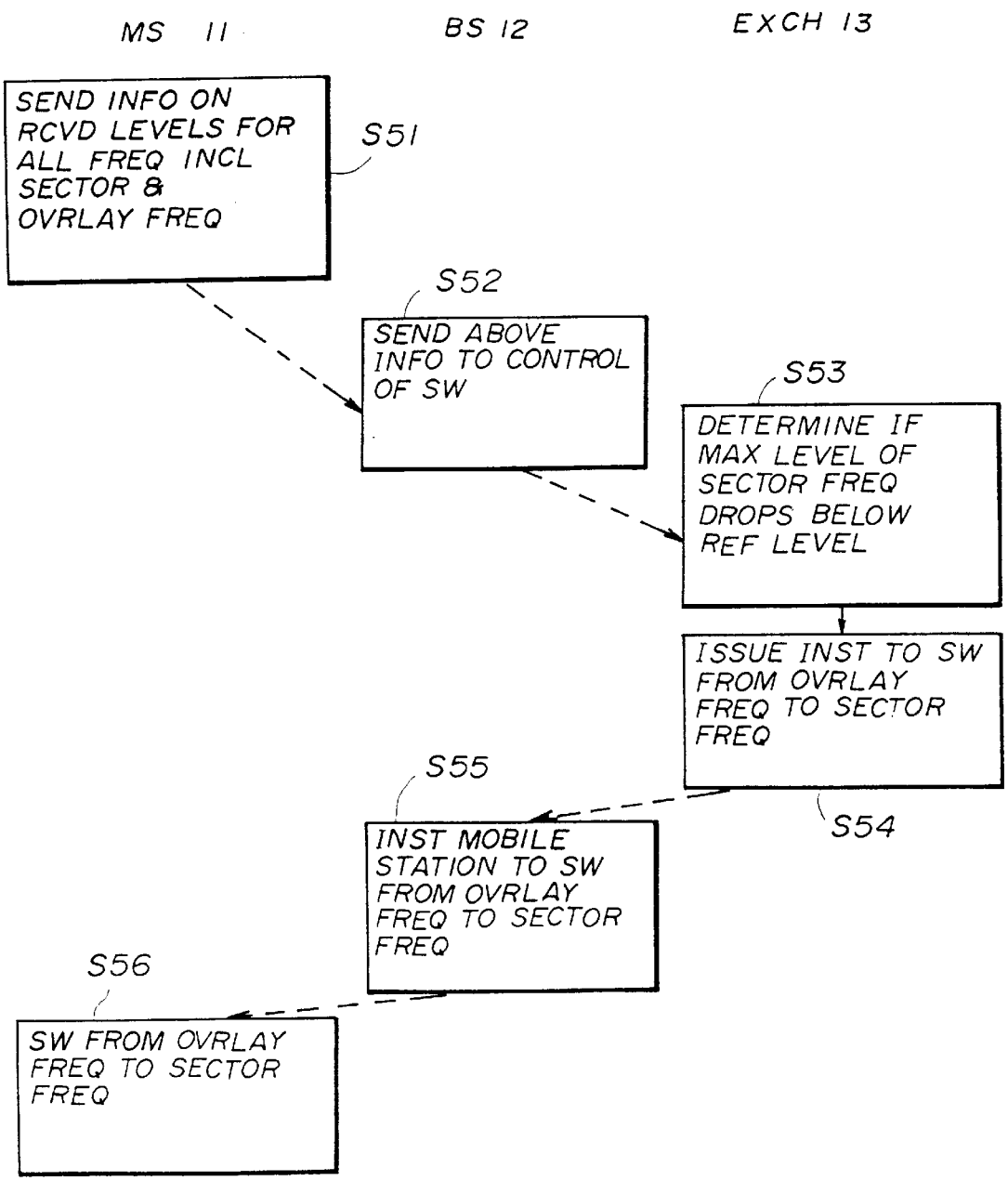
FIG. 13 describes the frequency switching operation, of the mobile terminal and the base station, effected when the mobile terminal moves from the overlay region into the sector in the third embodiment of the present invention.

FIG. 12 shows the frequency switching operation effected when the mobile terminal 11, in communication with the base station 12 at the sector frequencies $f_A$, $f_B$, moves into the overlay region OL. In step 41, the mobile terminal 11 monitors the reception level at all the reception frequencies $f_A$, $f_A'$. Specifically, when there are actually a plurality of frequencies being used for each of the reception frequencies $f_A$, $f_A'$ above, the monitoring is performed for all of them. The mobile terminal 11 sends the level data, indicating the reception level and obtained as a result of the monitoring, to the base station 12 via the control channel provided in the signal transmitted at the frequency $f_B$; and the base station 12 forwards the data to the switching station 13 in step S42. The switching station 13 forwards the level data sent from the base station 12 to the control unit 15a via the interface unit 15c; and the control unit 15a determines, in step S43, whether or not the transmission at the overlay frequency $f_A'$ exceeds a predetermined threshold level corresponding to the threshold field strength level $TH_2$. If an affirmative answer results from the step S43 determination, the control unit 15a issues, in step S44, an instruction by which the transmission frequency of the base station 12 is switched from the sector frequency $f_A$ to the overlay frequency $f_A'$ and the reception frequency thereof is switched from the sector frequency $f_B$ to the overlay frequency $f_B'$, and sends the instruction to the switching apparatus 14 via the interface unit 15c. The switching apparatus 14 forwards the same to the base station 12 via the transmission channel 214. The base station 12 executes, in step S45, the frequency switching from the sector frequency to the overlay frequency in accordance with the instruction from the switching station 13, as well as giving an instruction relating to the frequency switching in the mobile terminal 11 via the control channel carried by the sector frequency $f_A$. In response to this, the mobile terminal 11 switches, in step S46, its transmission frequency from the sector frequency $f_B$ to the overlay frequency $f_B'$ and switches the reception frequency from the sector frequency $f_A$ to the overlay frequency $f_A'$.

When the mobile terminal 11 moves out of the overlay region OL, the mobile terminal 11 measures, in step S51, the level of all the received signals, and sends the data indicative of the result of the measurement to the base station 12 via the control channel provided in the signal transmitted at the overlay frequency $f_B'$. The base station 12 forwards, in step S52, the same data to the switching station 13 via the transmission channel 214; the data thus transmitted is forwarded to the control unit 15a of the control apparatus 15 via the interface unit 15c.

In step S53, the control unit 15a monitors whether or not the level of the signal, transmitted from the base station 12 at the frequency $f_A$, is below the predetermined threshold level corresponding to the threshold field strength level $TH_1$ of the overlay region OL, and, when it is found that the above signal level is below the threshold level, issues, in step S54, an instruction by which the transmission signal of the base station 12 is switched from the overlay frequency $f_A'$ to the sector frequency $f_A$ and the reception signal thereof is switched from the overlay frequency $f_B'$ to the sector frequency $f_B$, and forwards the instruction to the switching apparatus 14 via the interface unit 15c. The switching apparatus 14 transmits the instruction thus forwarded to the base station 12 via the transmission channel 214; and the base station 12 executes, in step S55, the frequency switching in accordance with the above instruction. Further, the base station 12 transmits an instruction, by which instruction the transmission frequency of the mobile terminal 11 is switched from $f_B'$ to $f_B$ and the reception frequency thereof is switched from the overlay frequency $f_A'$ to the sector frequency $f_A$, to the mobile terminal 11 by consigning the same instruction to the control channel carried by the transmission frequency $f_A'$. In response to this, the mobile terminal 11 executes, in step S56, the corresponding frequency switching. As described in the earlier embodiment, there are generally a plurality of frequencies used as each of the sector frequencies $f_A$, $f_B$. It is determined, in step S53, whether or not the level of the transmitted signal producing the maximum level is below the predetermined threshold level. In step S54, the control unit 15a allocates the vacant sector frequency.

A description will now be given of the fourth embodiment of the present invention, with reference to the block diagram of FIG. 14 and the flow charts of FIGS. 15 and 16.

Figure 14:
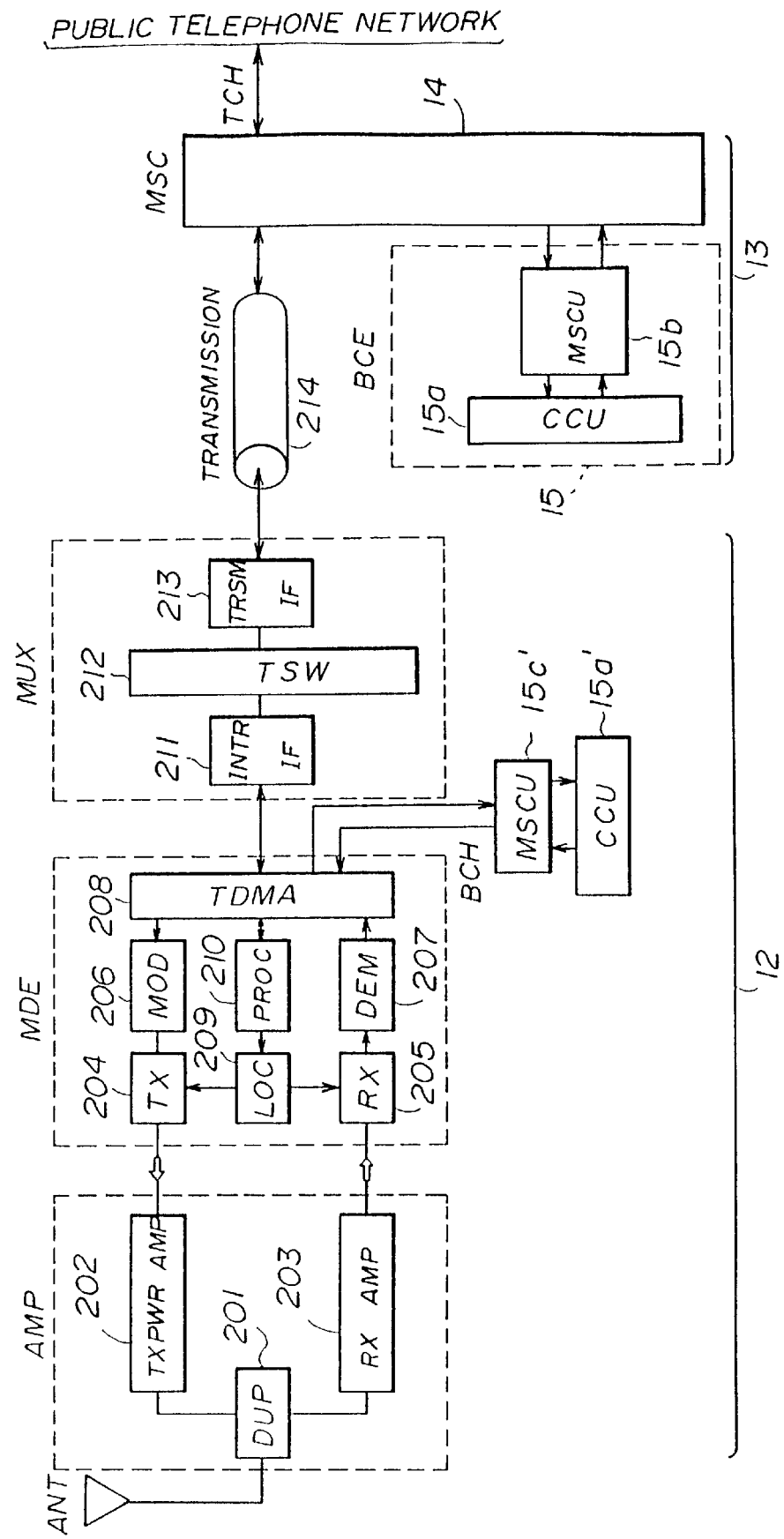
FIG. 14 is a block diagram showing the configuration of the base station and the switching station used in the fourth embodiment of the present invention.

Referring to FIG. 14, this diagram shows the configuration of the base station 12' and the switching station 13' used in this embodiment. In the figure, parts that are common to FIG. 6 are given the same reference numerals, and the descriptions thereof are omitted.

In this embodiment, a control unit 15a' is provided to correspond to the control unit 15a of FIG. 6 and is connected to the time division multiplexing access unit 208 via an interface unit 15c'. The interface unit 15c' extracts a B channel signal from the control channel as does the unit 15c, and forwards the extracted signal to the control unit 15a' as well as forwarding the output signal from the control unit 15a' to the time division multiplexing access unit 208 using the B channel.

Figure 15:
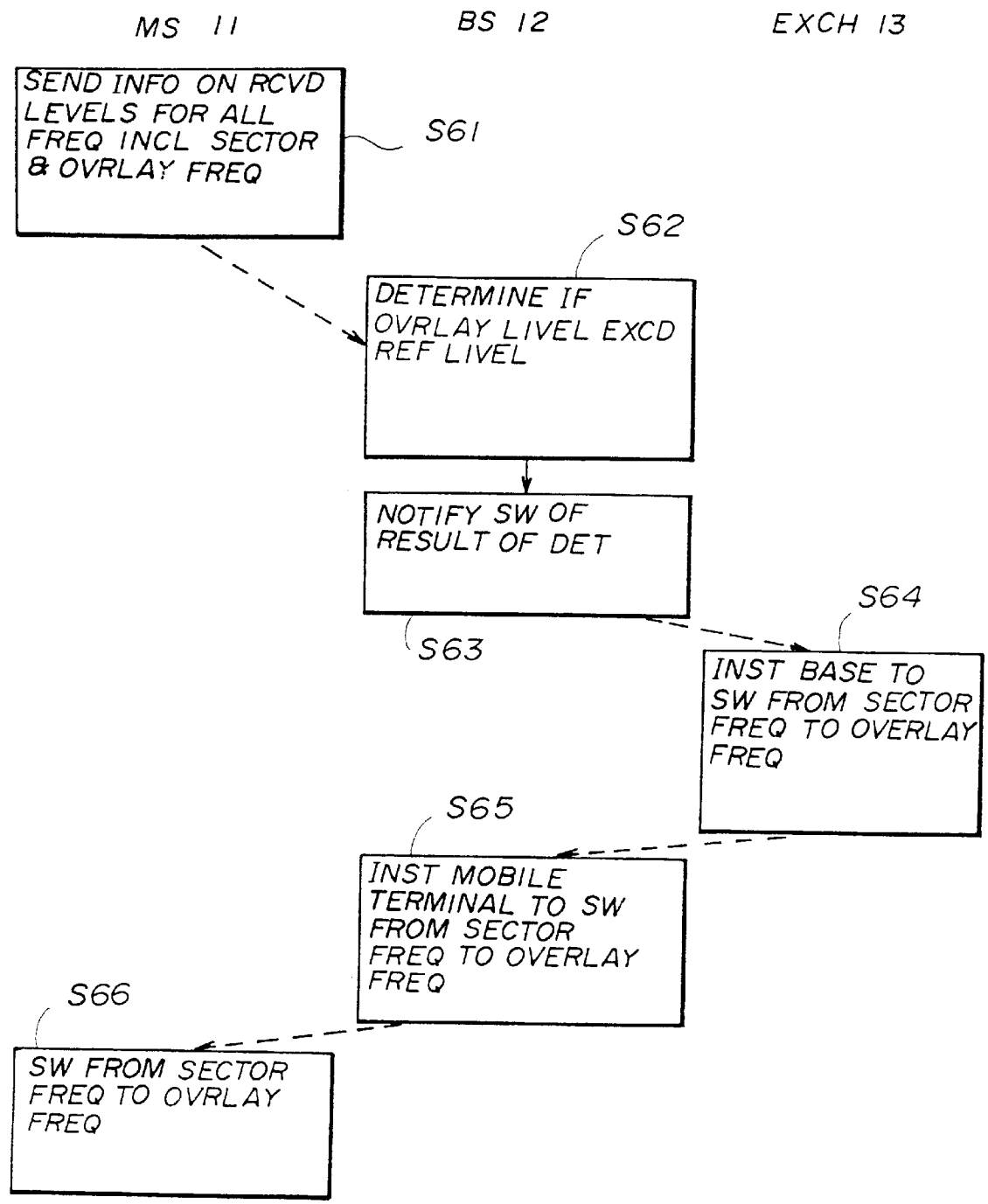
FIG. 15 describes the frequency switching operation, of the mobile terminal and the base station, effected when the mobile terminal moves from the sector into the overlay region in the fourth embodiment of the present invention.

FIG. 15 shows the frequency switching control of the mobile terminal 11 and the base station 12, which control is effected when the mobile terminal 11 moves into the overlay region.

Referring to FIG. 15, in step S61, the mobile terminal 11 is communicating with the base station 12 at the sector frequency, monitoring the level of transmission from the base station 12 at all the sector frequencies $f_A$ and the overlay frequencies $f_A'$. The mobile terminal 11 forwards the monitored data thus obtained to the base station 12 via the control channel carried by the frequency $f_B$; and the base station 12 sends the monitored data to the control unit 15a' via the interface unit 15c'. In step S62, the control unit 15a' of the base station 12 determines whether or not the level of the signal having the overlay frequency $f_A'$ exceeds the threshold field strength level $TH_2$. If an affirmative answer results from this determination, the control unit transmits, in step S63, the information indicating the fact to the switching station 13. The control unit 15a of the switching station 13 issues, in step S64, an instruction by which the frequency used in communication between the base station 12 and the mobile terminal 11 is switched from the sector frequencies to the overlay frequencies, and this instruction is forwarded to the base station 12 via the transmission channel 214. In step S65, the base station 12 switches, in accordance with the instruction from the switching station 13, the transmission frequency and the reception frequency from the sector frequencies $f_A$, $f_B$ to the overlay frequencies $f_A'$, $f_B'$, respectively. In correspondence to this, the mobile terminal 11 switches, in step 66, the reception frequency and the transmission frequency from the sector frequencies $f_A$, $f_B$ to the overlay frequencies $f_A'$, $f_B'$.

A description will now be given, with reference to FIG. 16, of the frequency switching control of the mobile terminal 11 and the base station 12, which control is effected when the mobile terminal 11 moves out of the overlay region OL.

Figure 16:
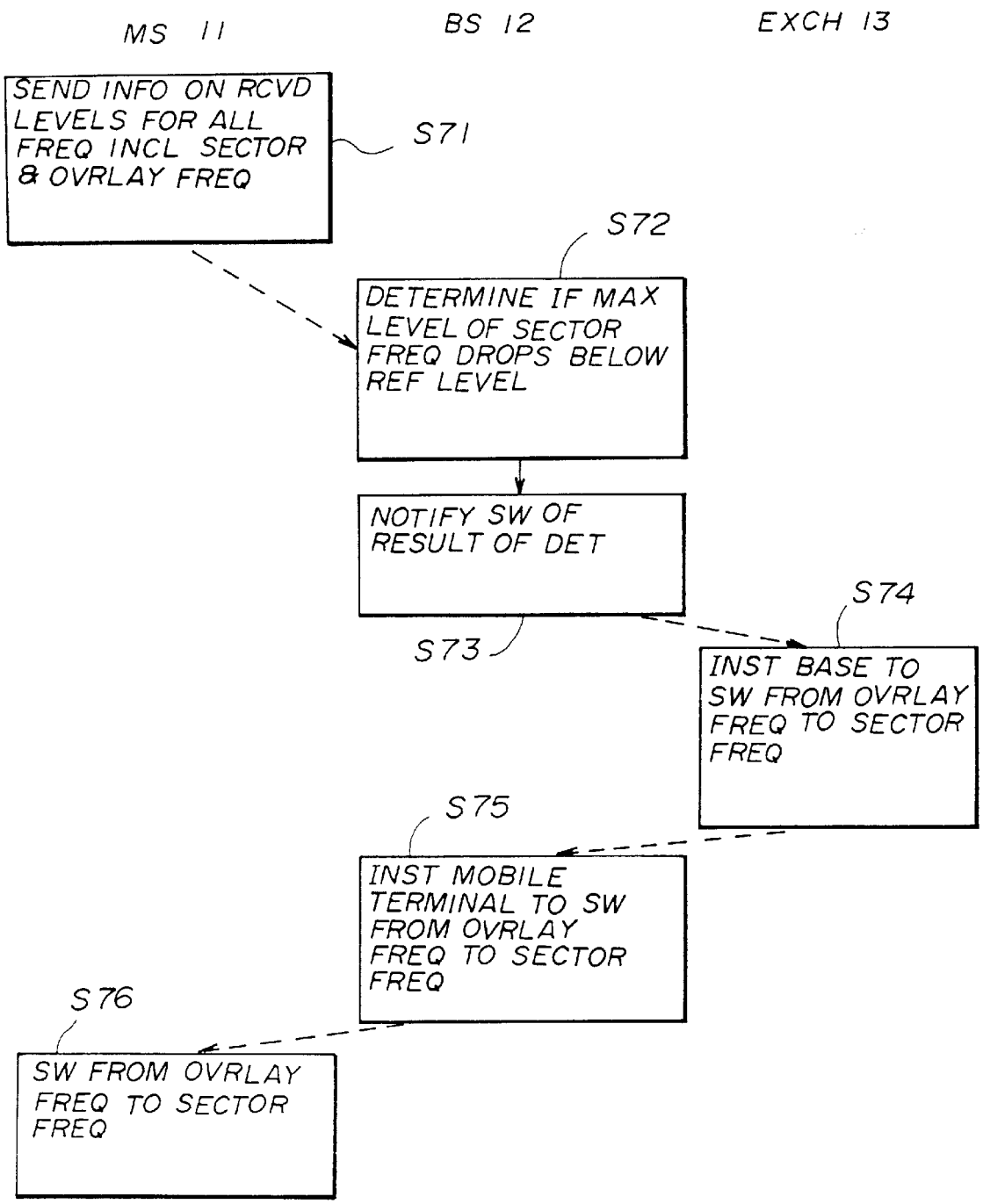
FIG. 16 describes the frequency switching operation, of the mobile terminal and the base station, effected when the mobile terminal moves from the overlay region into the sector in the fifth embodiment of the present invention.

Referring to FIG. 16, the mobile terminal 11 is communicating with the base station 12 at the overlay frequency in step 71, while at the same time monitoring the level of the signal transmitted from the base station 12, at the sector frequency $f_A$ and the overlay frequency $f_A'$. Further, the mobile terminal 11 transmits the monitored data indicative of the result of monitoring to the base station 12 via the control channel carried by the frequency $f_B'$. The base station 12 extracts the monitored data transmitted from the mobile terminal 11, via the time division multiplexing access unit 208, and forwards the extracted data to the control unit 15a'. The control unit 15a' monitors, in step S72, whether or not the level of the signal in the monitored data, transmitted at the sector frequency $f_A$, is below the predetermined threshold level, and when the above signal level is below the threshold level, sends, in step S73, the switching station 13 the information indicative of that fact. In step S74, the control unit 15a of the switching station 13 issues, in accordance with the information sent from the base station 12, an instruction by which the frequency used in communication between the base station 12 and the mobile terminal 11 is switched from the overlay frequency to the sector frequency, and forwards the instruction to the base station 12. In response to this, the base station 12 switches the transmission frequency from the overlay frequency $f_A'$ to the sector frequency $f_A$ and switches the reception frequency from the overlay frequency $f_B'$ to the sector frequency $f_B$.

Possible Industrial Application

The present invention enables a stable frequency switching control in a digital mobile telephone system in which an overlay region is formed within a sector to correspond to a base station, and the sector and the overlay region are covered by signals transmitted at different frequencies, the stable control being enabled because the frequency used in communication between a mobile terminal and the base station is switched in accordance with the field strength level of the signal transmitted from the base station and received by the mobile terminal, when the mobile terminal moves from the sector into the overlay region or when the mobile terminal moves from the overlay region into the sector. Thus, it is possible to smoothly operate the digital mobile telephone system having an overlay configuration, and to greatly improve efficiency in the use of frequencies thereof.

We claim:

1. A digital mobile telephone system connected to a public telephone line, comprising:

a switching station connected to the public telephone line;

at least one base station connected to said switching station, including a corresponding base station for each sector covered by said digital mobile telephone system, transmitting a first radio signal having a first frequency different from one sector to another, the field strength of said first radio signal exceeding a predetermined level in each sector, the corresponding base station for each sector receiving a second radio signal having a second frequency different from said first frequency and different from one sector to another, each base station transmitting a third radio signal having a third frequency different from said first and second frequencies to cover an overlay region and having a field strength and a range smaller than said first radio signal;

a mobile terminal, connected to the public telephone line by said switching station, receiving, in each sector, said first radio signal having said first frequency, monitoring, in each sector, the field strength of said first radio signal transmitted from the corresponding base station, and transmitting said second radio signal having said second frequency and a control signal indicative of the result of the monitoring to the corresponding base station; and a control apparatus provided in said switching station to control transmission of said first and second radio signals by said at least one base station and said mobile terminal, respectively, the corresponding base station forwarding the control signal transmitted from said mobile terminal to said control apparatus and in response said control apparatus switches transmission by the corresponding base station from said first frequency to said third frequency, when the field strength of said first radio signal transmitted from the corresponding base station and monitored by said mobile terminal exceeds a predetermined threshold level, while, at the same time, switching reception by the corresponding base station from said second frequency to a fourth frequency, switching reception by said mobile terminal from said first frequency to said third frequency; and switching transmission by said mobile terminal from said second frequency to said fourth frequency.

2. The digital mobile telephone system as claimed in claim 1, wherein said control apparatus switches, based on the control signal forwarded from the corresponding base station, when the field strength drops below said predetermined threshold level, reception by the corresponding base station from said fourth frequency to said second frequency, and switches transmission by the corresponding base station from said third frequency to said first frequency, also switching reception by said mobile terminal from said third frequency to said first frequency, and switching transmission by said mobile terminal from said fourth frequency to said second frequency.

3. The digital mobile telephone system as claimed in claim 1, wherein said mobile terminal comprises:

monitoring means for monitoring the field strength of said first radio signal transmitted at said first frequency; and determining means for outputting a first signal as the control signal, when the field strength of said first radio signal transmitted at said first frequency exceeds said predetermined threshold level, said determining means adding the control signal to said second radio signal transmitted from said mobile terminal to said base station at said second frequency, after subjecting the control signal to time division multiplexing for transmission to the corresponding base station.

4. The digital mobile telephone system as claimed in claim 3, wherein said determining means outputs a second signal as the control signal, when the field strength of said first radio signal transmitted at said first frequency drops below said predetermined threshold level, and said determining means adds the control signal to a fourth radio signal transmitted from said mobile terminal to the corresponding base station at said fourth frequency, after subjecting the control signal to time division multiplexing for transmission to the corresponding base station.

5. The digital mobile telephone system as claimed in claim 1, wherein said mobile terminal comprises:

receiving means for reproducing the transmission from the corresponding base station by tuning into said first frequency, said receiving means further receiving the transmission from the corresponding base station at said third frequency by tuning into said third frequency;

monitoring means connected to said receiving means for monitoring the field strength of said third radio signal transmitted at said third frequency and received by said receiving means; and determining means for outputting a first signal as the control signal when the field strength of the transmission at said third frequency exceeds said predetermined threshold level, said determining means adding the control signal to said second radio signal transmitted from said mobile terminal to said base station at said second frequency, by subjecting the control signal to time division multiplexing for transmission to the corresponding base station.

6. The digital mobile telephone system as claimed in claim 5, wherein said determining means outputs a second signal as the control signal when the field strength of the transmission at said third frequency drops below said predetermined threshold level, said determining means adding the control signal to a fourth radio signal transmitted from said mobile terminal to the corresponding base station at said fourth frequency, after subjecting the control signal to time division multiplexing for transmission to the corresponding base station.

7. The digital mobile telephone system as claimed in claim 1, wherein said mobile terminal comprises monitoring means for monitoring the field strength of said first radio signal transmitted from the corresponding base station at said first frequency and generating field strength data indicating said field strength, in that said mobile terminal transmits said field strength data to the corresponding base station as the control signal, in that the corresponding base station forwards the control signal to said control apparatus of said switching station, and in that said control apparatus determines, based on said field strength data, whether the field strength of the transmission at said first frequency exceeds said predetermined threshold level.

8. The digital mobile telephone system as claimed in claim 1,
wherein said mobile terminal comprises:
receiving means for reproducing the transmission from the corresponding base station by tuning to said first frequency, said receiving means further receiving the transmission from the corresponding base station at said third frequency by tuning to said third frequency;
monitoring means connected to said receiving means for monitoring the field strength of said third radio signal transmitted at said third frequency and received by said receiving means to generate field strength data indicating said field strength,
wherein said mobile terminal transmits said field strength data to the corresponding base station as the control signal,
wherein the corresponding base station forwards the control signal to said control apparatus of said switching station, and
wherein said control apparatus determines, based on said field strength data, whether the field strength of the transmission at said first frequency exceeds said predetermined threshold level.

9. The digital mobile telephone system as claimed in claim 1,
wherein the corresponding base station adds, to said first radio signal at said first frequency, a first identifying signal indicating that the transmission is from the corresponding base station having an overlay region and transmits said first radio signal with the first identifying signal, further adding, to said third radio signal at said third frequency, a second identifying signal indicating that the transmission covers the overlay region and transmits said third radio signal with the second identifying signal, and
wherein said mobile terminal receives said first radio signal having the first identifying signal, and monitors the field strength thereof.

10. The digital mobile telephone system as claimed in claim 9, wherein said mobile terminal receives a plurality of transmitted signals having the first identifying signal, and monitors the field strength of one of the transmitted signals producing a greatest field strength level.

11. The digital mobile telephone system as claimed in claim 1,
wherein the corresponding base station adds, to said third radio signal at said third frequency, an identifying signal indicating that the transmission covers the overlay region and transmits said third radio signal with the identifying signal, and
wherein said mobile terminal receives said third signal having the identifying signal, and monitors the field strength thereof.

12. A digital mobile telephone system, comprising:
a switching station connected to a public telephone line and connecting a mobile terminal to said public telephone line;
one or a plurality of base stations connected to said switching station and each covering one or a plurality of sectors with transmission of a radio signal having a first frequency different from one sector to another, the covering being done in such a manner that the field strength of said radio signal exceeds a predetermined level in each sector, and the base station in each sector receiving a radio signal having a second frequency different from said first frequency and different from one sector to another;
a mobile terminal receiving, in each sector, a radio signal having said first frequency and transmitting a radio signal having said second frequency in its communication with the base station corresponding to said sector;
a control apparatus provided in said switching station and controlling said base station and said mobile terminal so as to control said first frequency and said second frequency in correspondence to said one or plurality of sectors, the digital mobile telephone system being characterized in that:
each of said base stations covers, with transmission of a radio signal having a third frequency different from said first and second frequency, an overlay region which is characterized by field strength smaller than that in said one or plurality of sectors and has a range smaller than that of said one or plurality of sectors;
said mobile terminal monitors, in each sector, the field strength of the radio signal transmitted from said base station, and transmits a control signal indicative of the result of monitoring to the base station;
said base station generates, in accordance with said first control signal transmitted from said mobile terminal, a second control signal indicating whether or not the field strength of the radio signal transmitted from said base station exceeds the predetermine threshold field strength level, and forwards the second control signal to the control apparatus provided in said switching station;
said control apparatus switches, on the basis of the second control signal forwarded from said base station, the transmission frequency of said base station from said first frequency to said third frequency, when the field strength of the radio signal transmitted from said base station and monitored by said mobile terminal exceeds a predetermined threshold field strength level, while, at the same time as this, switching the reception frequency from said second frequency to a fourth frequency, switching the reception frequency of said mobile terminal from said first frequency to said third frequency; and switching the transmission frequency thereof from said second frequency to said fourth frequency.

13. A control method for switching the frequency used in communication between a base station and a mobile terminal, which method is incorporated in a digital mobile telephone system comprising: base stations connected to a public telephone line via a switching station, covering a first region by means of transmission of a digital signal having a first frequency, covering a second region smaller than said first region by means of transmission of a digital signal having a second frequency, receiving a digital signal having a third frequency when transmitting at said first frequency, and receiving a digital signal having a fourth frequency when transmitting at said second frequency; a mobile terminal communicating with said base stations at a reception frequency and a transmission frequency corresponding to the transmission frequency and the reception frequency of said base stations respectively, said control method comprising steps of:

detecting, at the mobile terminal, the field strength of the signal transmitted from the base station, setting the reception frequency of said mobile terminal to said second frequency when said field strength exceeds a predetermined threshold field strength level, while at the same time setting the transmission frequency of said mobile terminal to said fourth frequency, and setting the reception frequency of said mobile terminal to said first frequency when said field strength drops below said predetermined threshold field strength level, while at the same time setting the transmission frequency of said mobile terminal to said third frequency.

14. The method as claimed in claim 13, wherein the step of detecting said field strength comprises a step of detecting the field strength of a signal transmitted from the base station at said first frequency.

15. The method as claimed in claim 13, wherein the step of detecting said field strength comprises a step of detecting the field strength of a signal transmitted from the base station at said second frequency.

16. A digital mobile telephone system, comprising:

a plurality of base stations, each providing communication for a sector and an overlay region having a size smaller than the sector, each base station transmitting a first transmission signal to the sector and a second transmission signal to the overlay region;

a mobile terminal having monitoring means for receiving and monitoring an electric field strength of the first transmission signal from one of said base stations; and a controller controlling the one of said base stations and said mobile terminal to communicate using the second transmission signal from the one of said base stations, when the electric field strength of the first transmission signal, as reported by said mobile terminal to said controller via the one of said base stations, exceeds a level at which reception of the second transmission signal is possible by said mobile terminal.

* * * * *